United States Patent [19]

Giffin, III et al.

[11] Patent Number: 5,154,052
[45] Date of Patent: Oct. 13, 1992

[54] EXHAUST ASSEMBLY FOR A HIGH SPEED CIVIL TRANSPORT AIRCRAFT ENGINE

[75] Inventors: Rollin G. Giffin, III; Jeremiah P. Wolf, both of Cincinnati; Mark A. Hilse, Middletown, all of Ohio

[73] Assignee: General Electric Company, Cincinnati, Ohio

[21] Appl. No.: 520,318

[22] Filed: May 7, 1990

[51] Int. Cl.⁵ .............................................. F02K 1/38
[52] U.S. Cl. .................................. 60/262; 239/265.13
[58] Field of Search ................. 60/262, 263, 226.1, 60/269; 239/265.13

[56] References Cited

U.S. PATENT DOCUMENTS

| | | | |
|---|---|---|---|
| 3,333,772 | 8/1967 | Bruner | 60/263 |
| 3,524,588 | 8/1970 | Duval | 239/265.13 |
| 3,579,993 | 5/1971 | Tanner | 60/262 |
| 3,927,522 | 12/1975 | Bryce et al. | 60/262 |
| 3,955,782 | 5/1976 | Calder et al. | 60/262 |
| 3,987,621 | 10/1976 | Sabatella et al. | 60/262 |
| 4,043,121 | 8/1977 | Thomas et al. | 60/262 |
| 4,052,847 | 10/1977 | Rodgers et al. | 60/262 |
| 4,064,692 | 12/1977 | Johnson et al. | 60/262 |
| 4,290,262 | 9/1981 | Wynosky et al. | 60/262 |
| 4,587,803 | 5/1986 | Nightingale et al. | 60/226.1 |
| 4,919,364 | 4/1990 | John et al. | 60/263 |

FOREIGN PATENT DOCUMENTS

| | | | |
|---|---|---|---|
| 0659621 | 3/1963 | Canada | 239/265.13 |
| 0849502 | 9/1960 | United Kingdom | 239/265.13 |
| 871265 | 6/1961 | United Kingdom | |
| 871274 | 6/1961 | United Kingdom | |
| 1085090 | 9/1967 | United Kingdom | |
| 1122910 | 8/1968 | United Kingdom | |
| 1167096 | 10/1969 | United Kingdom | |
| 1325370 | 8/1973 | United Kingdom | |

*Primary Examiner*—Richard A. Bertsch
*Assistant Examiner*—Michael I. Kocharov
*Attorney, Agent, or Firm*—Jerome C. Squillaro

[57] ABSTRACT

An exhaust assembly is provided for a gas turbine engine effective for propelling an aircraft from takeoff through subsonic and supersonic velocity. The exhaust assembly is effective for receiving exhaust gases discharged from an outlet of a core engine of an aircraft gas turbine engine. The assembly includes a casing, a variable area converging-diverging nozzle attached to the casing and including a first throat and an outlet for channeling exhaust gases received from the core engine. A plurality of retractable chutes are disposed upstream of the nozzle outlet and are positionable in a deployed position forming a converging nozzle having a second throat with a flow area less than that of the first throat. Means are provided for channeling air along aft facing surfaces of the chutes into the CD nozzle for mixing with the exhaust gases when the chutes are disposed in the deployed position for reducing noise from the exhaust gases.

37 Claims, 12 Drawing Sheets

Fig. 25.
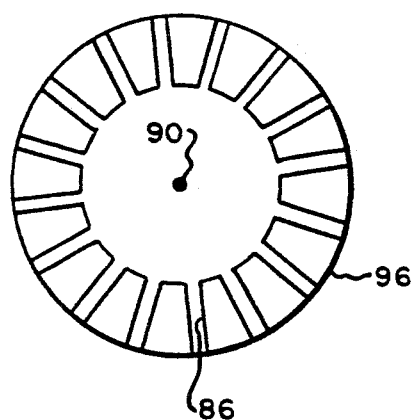
Fig. 26.
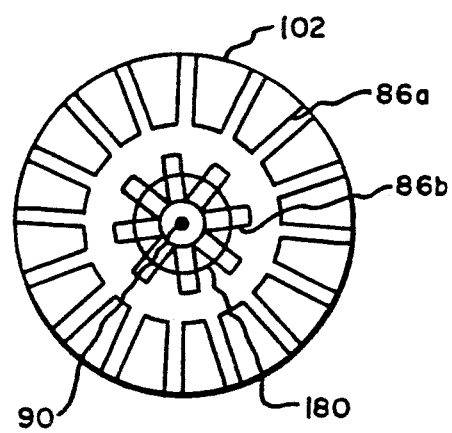
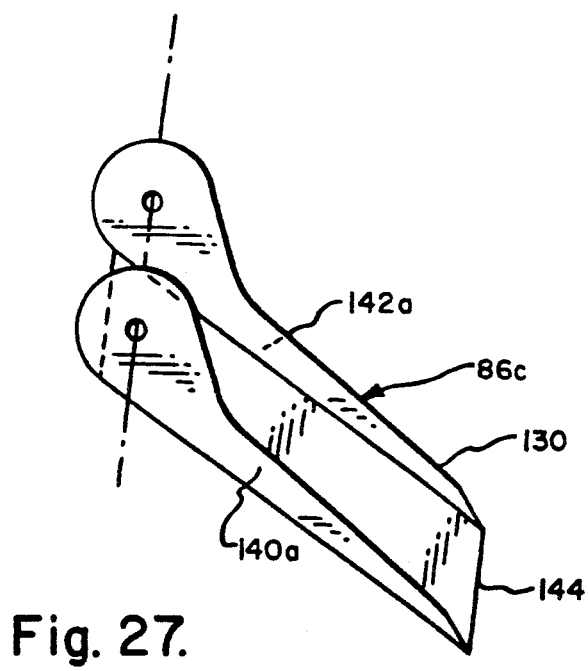
Fig. 27.
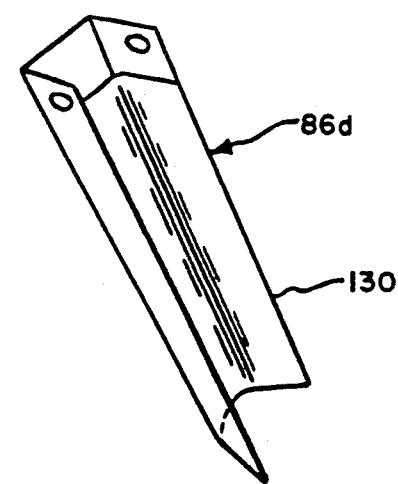
Fig. 28.

EXHAUST ASSEMBLY FOR A HIGH SPEED CIVIL TRANSPORT AIRCRAFT ENGINE

TECHNICAL FIELD

The present invention relates generally to aircraft gas turbine engines, and, more specifically, to an engine exhaust assembly including a variable area nozzle for propelling an aircraft at subsonic and supersonic velocity while providing for noise reduction during takeoff.

BACKGROUND ART

Gas turbine engines designed for propelling an aircraft at supersonic velocity typically have high specific thrust to enable relatively small engine size. Large engine size, and respective heavy weight, are undesirable for supersonic aircraft. The engine specific thrust is represented in terms of pounds of thrust per pound of airflow, and high values thereof produce high engine exhaust velocities. However, jet noise is directly proportional to exponential values of exhaust velocities, and, for a high speed civil transport aircraft operable at flight velocities of greater than about Mach 2, jet noise is proportional to the fourth order of exhaust velocity.

Government regulation limits the acceptable amount of noise which may be generated by aircraft engines during takeoff and initial climb of the aircraft. Since jet noise is directly proportional to exhaust velocity, and since it is desirable to have relatively small aircraft engines with relatively high specific thrust, exhaust velocities are substantial and effective means for reducing the noise are required which do not adversely affect the performance of the engine or decrease specific thrust.

Since high speed civil transport (HSCT) gas turbine engines are sized for propelling the HSCT aircraft at supersonic velocity, conventional variable area converging-diverging exhaust nozzles are required for efficiently operating the engine from takeoff through subsonic to supersonic aircraft velocities. The exhaust gases channeled through the exhaust nozzle also flow at supersonic velocity resulting in relatively high jet noise from the engine.

Conventional means for suppressing jet noise include mixing relatively cool ambient airflow or engine bypass airflow with the exhaust gases for reducing the velocities thereof and thusly reducing jet noise. The air is typically mixed with exhaust gases through conventional ejector means or through a coannular cooling air channel formed around a plug centerbody disposed in the exhaust nozzle. Various types of chutes are also conventionally known for mixing low velocity air with the high velocity exhaust gases.

However, conventional means for suppressing jet engine exhaust noise have varying degrees of effectiveness, and would be relatively large for a HSCT gas turbine engine application for propelling an aircraft at relatively high supersonic velocity greater than about Mach 2.

OBJECTS OF THE INVENTION

Accordingly it is one object of the present invention to provide a new and improved exhaust assembly for a gas turbine engine.

Another object of the present invention is to provide an exhaust assembly for use in a gas turbine engine for powering an aircraft at supersonic velocity.

Another object of the present invention is to provide an exhaust assembly which is relatively small and lightweight for use with an engine for powering an aircraft at supersonic velocity.

Another object of the present invention is to provide an exhaust assembly incorporating means for suppressing noise of exhaust gases discharged from the assembly.

Another object of the present invention is to provide an exhaust assembly including acoustic suppression of exhaust gases in combination with a variable area converging-diverging exhaust nozzle.

Another object of the present invention is to provide an exhaust assembly effective for efficient operation of an engine for powering an aircraft from takeoff through subsonic and supersonic velocity.

Another object of the present invention is to provide an exhaust assembly including means for suppressing noise from exhaust gases which is selectively operable during a takeoff mode of operation of the aircraft.

DISCLOSURE OF INVENTION

An exhaust assembly is provided for a gas turbine engine effective for propelling an aircraft from takeoff through subsonic and supersonic velocity. The exhaust assembly is effective for receiving exhaust gases discharged from an outlet of a core engine of the aircraft gas turbine engine. The assembly includes a casing, a variable area converging-diverging CD nozzle attached to the casing and including a first throat and an outlet for channeling exhaust gases received from the core engine. A plurality of retractable chutes are disposed upstream of the nozzle outlet and are positionable in a deployed position forming a converging nozzle having a second throat with a flow area less than that of the first throat. Means are provided for channeling air along aft facing surfaces of the chutes into the CD nozzle for mixing with the exhaust gases when the chutes are disposed in the deployed position for reducing noise from the exhaust gases.

BRIEF DESCRIPTION OF DRAWINGS

The novel features believed characteristic of the invention are set forth and differentiated in the claims. The invention, in accordance with preferred, exemplary embodiments, together with further objects and advantages thereof, is more particularly described in the following detailed description taken in conjunction with the accompanying drawing in which:

FIG. 25 is an upstream facing, sectional view of an alternate embodiment of circumferentially spaced chutes for an axisymmetric embodiment of the exhaust assembly illustrated in FIG. 3 taken along line 7—7.

FIG. 26 is an upstream facing, sectional view of an alternate embodiment of circumferentially spaced radially inner and radially outer chutes for an axisymmetric embodiment of the exhaust assembly illustrated in FIG. 19 taken along line 23—23.

FIG. 27 is an isometric view of an individual chute in accordance with an alternate embodiment.

MODE(S) FOR CARRYING OUT THE INVENTION

Figure 1:
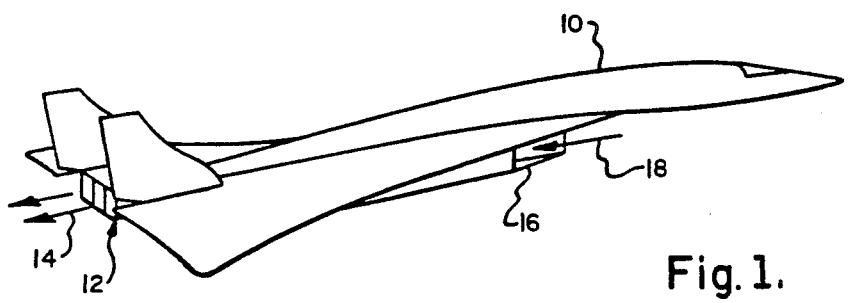
FIG. 1 is a schematic representation of a high speed civil transport aircraft operable from takeoff through subsonic and supersonic velocities.

Illustrated in FIG. 1 is a schematic representation of a high speed civil transport (HSCT) aircraft 10 operable from takeoff through subsonic and relatively high supersonic velocities, for example, greater than about Mach 2. The aircraft 10 is powered by two or more gas turbine engines 12, and, in this exemplary embodiment, by four engines 12 which discharge exhaust gases 14 for generating thrust for powering the aircraft 10. A conventional aircraft inlet 16 receives ambient airflow 18, which is channeled to the engines 12.

Figure 2:
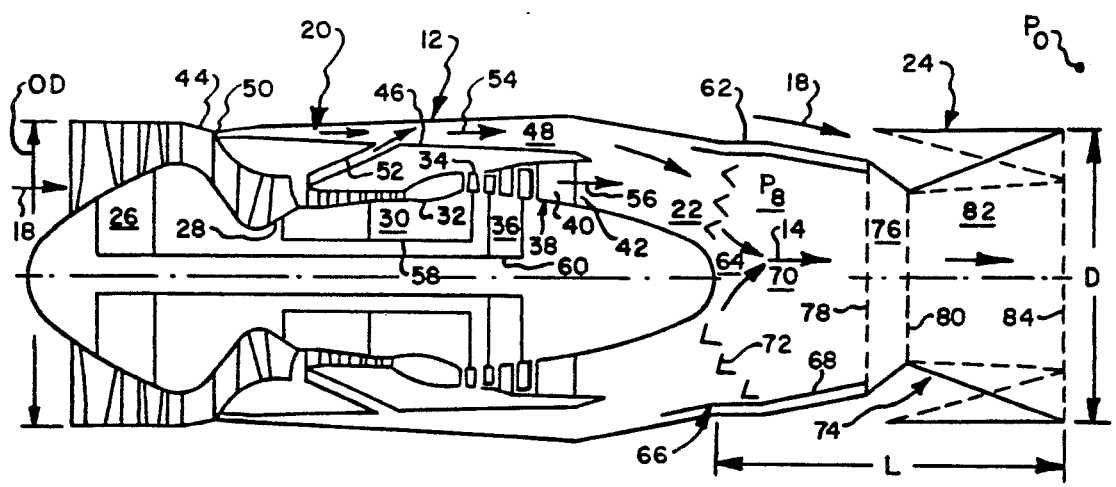
FIG. 2 is a schematic, longitudinal sectional view of a gas turbine engine for powering the aircraft illustrated in FIG. 1, including an exhaust assembly in accordance with one embodiment of the present invention.

Illustrated in FIG. 2 is a schematic, longitudinal sectional representation of one of the engines 12 illustrated in FIG. 1. The engine 12 includes a conventional core engine 20 having an annular outlet 22 for discharging the exhaust gases 14 into an exhaust assembly 24 in accordance with a preferred embodiment of the present invention.

The core engine 20 is a conventional double bypass turbofan gas turbine engine conventionally low pressure compressor (LPC) 28, a high pressure compressor (HPC) 30, a combustor 32, a high pressure turbine (HPT) 34, a two-stage low pressure turbine (LPT) 36, and an LPT frame 38 including a plurality of circumferentially spaced frame struts 40 which define an annular LPT outlet 42. An annular core casing 44 surrounds the core engine 20 from the fan 26 to the LPT outlet 42 and is spaced from an inner casing 46 to define an annular bypass duct 48. The bypass duct 48 includes an annular first inlet 50 disposed in flow communication with the fan 26, and an annular second inlet 52 disposed downstream from the first inlet 50 and in flow communication with the LPC 28.

The first and second inlets 50 and 52 provide for double bypass operation of the core engine 20 by channeling portions of the inlet airflow 18 compressed by the fan 26 and the LPC 28 into the bypass duct 48 as bypass airflow 54. The remainder of the inlet airflow 18 is channeled through the HPC 30 and into the combustor 32 where it is mixed with fuel and ignited for generating combustion gases 56 which are discharged from the LPT outlet 42. The HPT 34 is conventionally connected to both the LPC 28 and the HPC 30 by a first shaft 58, and the LPT 36 is conventionally connected to the fan 26 by a second shaft 60. The bypass duct 48 and the LPT outlet 42 discharge the bypass airflow 54 and the combustion gases 56 into the core engine outlet 22 where they are mixed together and discharged from the exhaust assembly 24 as the exhaust gases 14.

The core engine 20 is conventionally sized for having a HSCT engine cycle for powering the aircraft 10 from takeoff through subsonic to relatively high supersonic velocities of at least about Mach 2, in the exemplary embodiment. In the HSCT embodiment, the core engine 20 will have a maximum outer diameter OD of the fan 26 of about five feet and will be effective for generating about 50,000 pounds of takeoff thrust from the exhaust gases 14 for powering the aircraft 10 at supersonic velocity greater than about Mach 2.

The exhaust assembly 24 includes a casing 62 having an inlet 64 disposed in flow communication with the core engine outlet 22 for receiving the exhaust gases 14 therefrom. In this exemplary embodiment of the invention, the assembly 24 further includes a conventional augmentor 66 having a conventional annular combustion liner 68 spaced radially inwardly from the casing 62, and defining radially therein a combustion zone 70. The augmentor 66 also includes a plurality of conventional flameholders 72 disposed in the casing inlet 64. In conventional operation, fuel is selectively introduced into the augmentor 66 upstream from the flameholders 72 and mixed with the bypass airflow 54 and the combustion gases 56 and ignited and burned in the combustion zone 70 for generating additional thrust from the exhaust gases 14.

The exhaust assembly 24 also includes a conventional variable area converging-diverging (CD) exhaust nozzle 74 conventionally attached to the casing 62 in flow communication with the augmentor 66 for receiving the exhaust gases 14 from the core engine 20. The CD nozzle 74 includes a converging channel 76 having an inlet 78 having a flow area $A_7$ and a first throat 80 having a flow area conventionally designated $A_8$. The CD nozzle 74 further includes a diverging channel 82 extending downstream from the first throat 80 to an outlet 84 having a flow area conventionally designated $A_9$.

During operation of the engine 12, a pressure ratio designated $P_8/P_0$ is conventionally generated across the CD nozzle 76, wherein $P_8$ represents total pressure at the inlet 78 and $P_0$ represents static pressure at the outlet 84. Since the engine 12 is sized for propelling the aircraft 10 at supersonic velocity, the pressure ratio $P_8/P_0$ will reach values substantially greater than about 1.85 thus requiring the CD nozzle 74 for accelerating the exhaust gases 14 to supersonic velocities or obtaining satisfactory values of the conventionally known gross thrust coefficient $C_{fg}$. For example, with the engine 12 sized for having the HSCT engine cycle, the pressure ratio $P_8/P_0$ can reach values up to about four at takeoff which will result in relatively high supersonic velocity of the combustion gases 14 with accompanying generation of noise therefrom. The flow areas $A_7$, $A_8$, and $A_9$ are of substantial importance since they are primary factors determining efficiency with which thrust is produced from the exhaust gases 14. The exhaust assembly 24 also substantially influences the performance of the core engine 20.

As illustrated in FIG. 2, the exhaust assembly 24 has an axial length L measured from the inlet 64 to the outlet 84, and a transverse dimension D, wherein D may either be an outer diameter for an axisymmetrical embodiment of the exhaust assembly 24, or a transverse width dimension for a generally rectangular 2D embodiment of exhaust assembly 24. In accordance with the present invention, the exhaust assembly 24 includes means for suppressing noise from the exhaust gases 14 during a takeoff mode of operation of the aircraft 10, which means may be relatively small with the dimension D being no greater than about the outer diameter OD of the fan 26, and also the length L may be relatively small. For comparison purposes, the HSCT engine 12 incorporating conventional acoustic suppression means (not shown) in the form of a centerbody plug with means for mixing low velocity air with the exhaust gases 14 may have an outer diameter D substantially greater than the fan outer diameter OD up to about seven feet for this particular embodiment with an accompanying length L of up to about 11.5 feet.

The exhaust assembly 24 in accordance with one embodiment of the present invention can have the dimension D about equal to the outer diameter OD of about five feet with an accompanying value of the length L of only about six feet. Accordingly, the exhaust assembly 24 is relatively small and light when compared with conventional exhaust assemblies having conventional acoustic suppression means. Furthermore, the exhaust assembly 24 in accordance with the present invention is effective for providing acoustic suppression during the takeoff mode of operation of the aircraft 10 while maintaining satisfactory values of the gross thrust coefficient $C_{fg}$ of the CD nozzle 74 without introducing significant aerodynamic performance losses.

Figure 3:
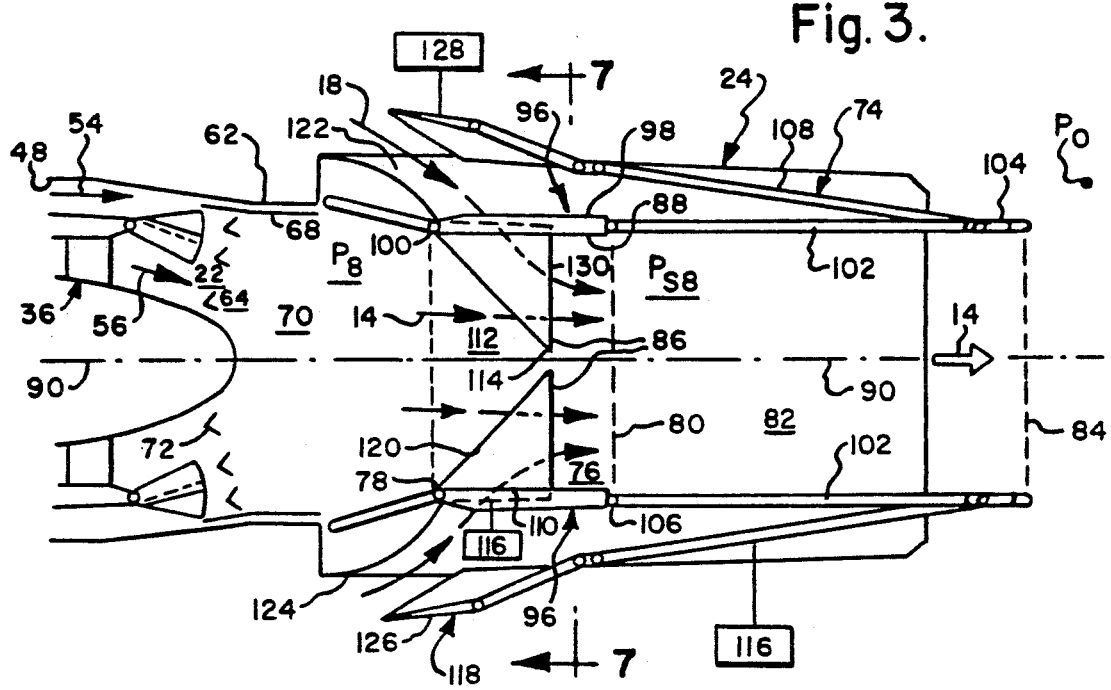
FIG. 3 is a schematic, longitudinal sectional view of one embodiment of the exhaust assembly illustrated in FIG. 2 shown in a first position including chutes deployed for suppressing exhaust gas noise.

Illustrated in more particularity in FIG. 3 is one embodiment of the exhaust assembly 24 in accordance with the present invention. The assembly 24 further includes a plurality of spaced apart retractable chutes 86 disposed upstream of the nozzle outlet 84 in a flowpath surface 88. More specifically, and referring to both FIGS. 3 and 7, the exhaust assembly 24 includes the CD nozzle 74 in the form of a rectangular 2D nozzle. The assembly 24 includes a longitudinal centerline axis 90, which in this embodiment of the invention is also the centerline axis of the engine 12; a transverse, horizontal axis 92; and a radial, vertical axis 94. The CD nozzle 74 includes a plurality of radially spaced apart primary flaps 96 disposed generally parallel to the transverse axis 92 for defining therebetween the converging channel 76. Each of the primary flaps 96 has a downstream end 98, and an upstream end 100 conventionally pivotally connected to the casing 62. The CD nozzle 74 further includes a plurality of radially spaced apart secondary flaps 102 which extend generally parallel to the transverse axis 92 and define therebetween the diverging channel 82. Each of the secondary flaps 102 has a downstream end 104, and an upstream end 106 conventionally pivotally connected to a respective one of the primary flap downstream ends 98 to define the first throat 80 between adjacent ones of the primary flaps 96. Conventional outer flaps 108 are pivotally connected at upstream ends thereof to the casing 62 and pivotally and slidably connected to respective ones of the secondary flap downstream ends 104.

Figure 7:
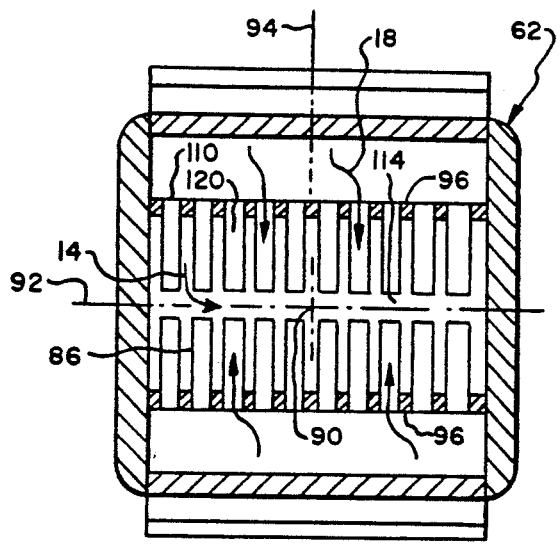
FIG. 7 is an upstream facing end view of the chutes illustrated in FIG. 3 taken along line 7—7.

The chutes 86 are disposed in the flowpath surface 88 which may be part of the secondary flaps 102, the primary flaps 96 or the casing 62 upstream of the primary flaps 96. In the exemplary embodiment illustrated in FIG. 3, the flowpath surface 88 is the radially inner surface of the primary flaps 96. The flaps 96 include respective complementary apertures 110 for receiving the chutes 86. The CD nozzle 74 is otherwise conventional except for the addition of the chutes 86. The chutes 86 are positionable in a deployed position as illustrated in FIGS. 3 and 7 inclined in a downstream direction radially inwardly from the flowpath surface 88 for forming a chute converging nozzle 112 in flow communication with the casing inlet 64. The chute converging nozzle 112 includes a second throat 114 having a flow area $A_8''$ which is less than the first throat area $A_8$. The chutes 86 are also positionable in a retracted position, illustrated for example in FIG. 4, generally coextensive with the flowpath surface 88 wherein they do not project into or disturb the exhaust gases 14 but merely define the flowpath surface of the conventional converging channel 76. Means 116 are provided for conventionally positioning the CD nozzle 74 and for positioning the chutes 86 in the deployed and retracted positions.

More specifically, FIG. 3 illustrates the exhaust assembly 24 in a take-off mode of operation of the engine 12. The primary and secondary flaps 96 and 102 are preferably conventionally positioned in a first position generally parallel to the longitudinal centerline axis 90 so that the converging channel 76 and the diverging channel 82 collectively provide a generally constant, or slightly diverging flow area for channeling the exhaust gases 14 through the CD nozzle 74, with the first throat area $A_8$ having a maximum value. The chutes 86 are disposed in the deployed position fully extended into the channel 76 for defining between the chutes 86 the chute converging nozzle 112 and the second throat 114. The core engine 20 conventionally requires a certain predetermined value of throat area ($A_8$) in the CD nozzle 74, which throat area ($A_8$) predeterminedly varies in accordance with the mode of operation of the core engine 20.

Accordingly, in the take-off mode of operation, wherein the CD nozzle 74 is positioned as above described, the converging channel 76 and the first throat 80 are not effective for providing the required throat area ($A_8$) required for operation of the core engine 20. Instead, the chutes 86 are sized and configured for obtaining the chute converging nozzle 112 wherein the chute second throat 114 is sized so that the area $A_8''$ is that predetermined value ($A_8$) required by the core engine 20 in the take-off mode of operation in lieu of using the converging channel 76 and the first throat 80 for that purpose. The primary and secondary flaps 96 and 102 are disposed in a retracted position spaced radially outwardly from the deployed chutes 86, as illustrated in FIG. 3, to configure the channels 76 and 82 in the form of an ejector into which the accelerated exhaust gases 14 received from the second throat 114 may expand and mix with the airflow 18.

Since the core engine 20 is designed with the HSCT engine cycle, the exhaust gases 14 must be accelerated to at least Mach 1 for providing a satisfactory gross thrust from the exhaust assembly 24. Accordingly, the chutes 86 are sized and configured in the deployed position so that the flow area decreases from the CD nozzle inlet 78, which is also the inlet to the chutes 86, to the second throat 114 for accelerating the exhaust gases 14 to Mach 1 at the second throat 114. The area ratio $A_7/A_8''$ is conventionally determined and the chutes 86 may be conventionally sized and configured in the deployed position for obtaining choked flow, i.e., Mach 1, at the second throat 114 during the take-off mode of operation of the core engine 20.

The chutes 86 in the deployed position are also effective for reducing, or suppressing, noise from the exhaust gases 14 when deployed in the take-off mode. More specifically, means 118, as illustrated for example in FIG. 3, are provided for channeling air, such as the ambient airflow 18 through the casing 62 and along aft facing surfaces 120 of the chutes 86 into the CD nozzle 74 for mixing with the exhaust gases 14 only when the chutes 86 are disposed in the deployed position. The channeling means 118 as illustrated in FIG. 3, for example, includes an ejector air channel 122 extending downstream from an ejector inlet 124 in the casing 62 for receiving ambient ejector air 18 and channeling the air 18 to an ejector outlet, i.e., aperture 110 in the primary flaps 96. An ejector door 126 in the form of an articulated scoop is positionable in a door open position for providing the upstream facing scoop 126 for receiving, or capturing, the ejector air 18 when the chutes 86 are disposed in the deployed position. The ejector doors 126 are also positionable in a closed position to cover the ejector inlet 124 for blocking entry of ejector air 18 into the ejector channel 122 when the chutes 86 are deployed in the retracted position (as illustrated for example in FIG. 4). Means 128, which may include conventional means, are provided for positioned the ejector doors in the open and closed positions.

Figure 8:
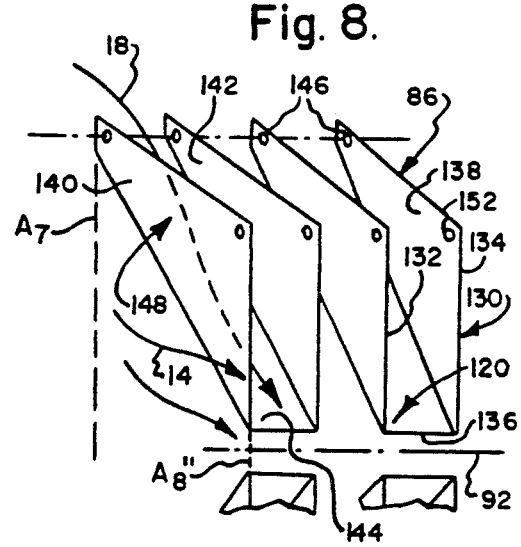
FIG. 8 is a perspective view of several of the chutes illustrated in FIG. 3 shown in the deployed position.

As illustrated in more particularity in FIGS. 7 and 8, the chutes 86 preferably include a generally U-shaped trailing edge 130 having first and second transversely spaced legs 132 and 134, a base 136 extending between the legs at radially inner ends thereof, and a top opening 138 extending between the legs at radially outer ends thereof. The trailing edge 130 is positioned in the exhaust gases 14 when the chutes 86 are positioned in the deployed position to define a shear perimeter wherein the ejector air 18 provided by the channeling means 118 along the trailing edge 130 contacts the exhaust gases 14 for mixing therewith. When the chutes 86 are disposed in the retracted position, the trailing edge 130 is removed from exhaust gases 14 as illustrated, for example, in FIG. 4.

The rear perimeter represents a shear or scrub line wherein the relatively low velocity ejector airflow 18 contacts the relatively high velocity exhaust gases 14 for reducing noise generated by the high velocity exhaust gases 14. The shear perimeter has a length represented by the sun of the individual lengths of the trailing edge first and second legs 132 and 134 and the base 136 of the several chutes 86. By utilizing generally U-shaped trailing edges 130 with a plurality of spaced apart chutes 86, a relatively high total shear perimeter is created for effectively suppressing noise from the exhaust gases 14. Since the trailing edges 130 (shear perimeter) are disposed at the downstream most ends of the chutes 86 they provide a relatively large shear perimeter as well as providing for improved ejection of the ejection airflow 18.

More specifically, and as illustrated in FIG. 3, since the chutes 86 are inclined for forming a chute converging nozzle 112, a static pressure $P_{s8}$ is created downstream of the trailing edges 130, which pressure $P_{s8}$ is relatively low since the chute trailing edges 130 overexpand the exhaust gases 114 into the generally open plenum, or ejector, created by the retracted primary and secondary flaps 96 and 102. The relatively low pressure $P_{s8}$ provides the ejector action which draws the ejector airflow 18 from outside the casing 62 and through the ejector channel 122 into the CD nozzle 74.

Referring again to FIG. 8, each of the chutes 86 further includes preferably generally triangular, transversely spaced apart first and second side plates 140 and 142 having the trailing edge legs 132 and 134 as bases thereof, and an inclined bottom plate 144 extending between hypotenuses. The side plates 140 and 142 have a conventional upstream pivot 146 disposed at an apex of the triangular plate about which the chute 86 is pivotable. The pivot 146 may simply be apertures in the chutes 86 through which is positioned a mounting bolt for pivotally connecting the chutes 86 to the primary flap 96. The side and bottom plates 140, 142 and 144 have an outer surface 148 which faces the exhaust gases 14 so that when the chute 86 is disposed in the deployed position the chute converging nozzle 112 is defined by the outer surfaces 148 of the bottom and side plates 140, 142 and 144. The side plates and bottom plate 140, 142 and 144 also have inner surfaces which define the aft facing surface 120 along which is channeled the ejector airflow 18 when the chutes are deployed.

Figure 4:
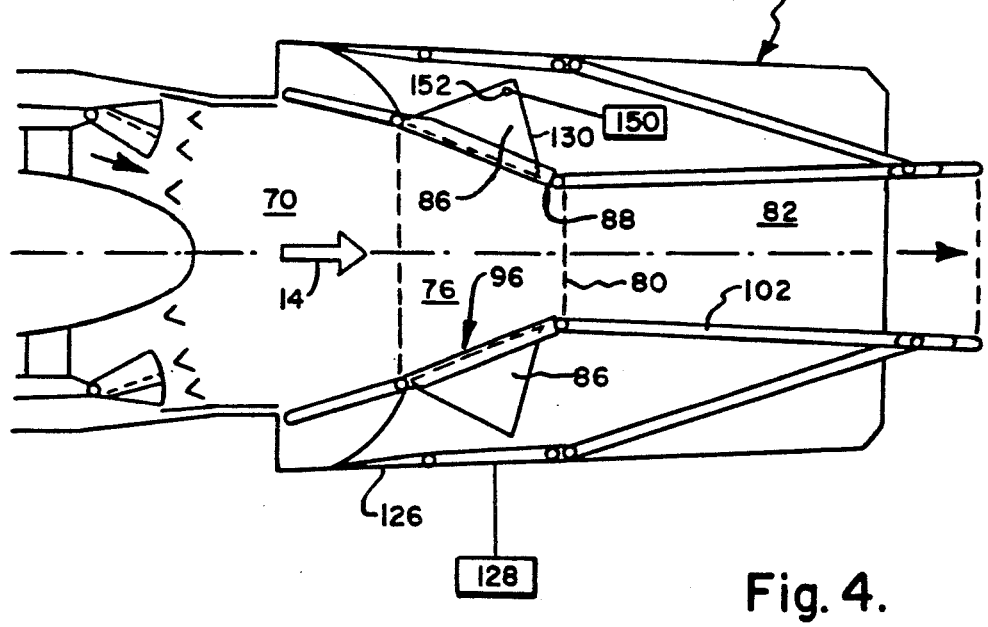
FIG. 4 is a schematic, longitudinal sectional view of the first exhaust assembly embodiment illustrated in FIG. 3 shown in a second position with the chutes retracted and the CD nozzle disposed for operation at transonic velocities of the aircraft.

Illustrated in FIG. 4 is the exhaust assembly 24 wherein the primary and secondary flaps 96 and 102 of the CD nozzle 74 are conventionally positioned in a second position for subsonic and transonic operation of the aircraft 10 with the chutes 86 disposed in the retracted position. The second position illustrated in FIG. 4, of course, occurs over a range of positions of the primary and secondary flap 96 and 102 which are generally similar to those positions illustrated in FIG. 4. In this position, the aircraft 10 has completed take-off and initial climb and no longer requires acoustic suppression by the chutes 86. The chutes 86 are disposed in the retracted position by chute retraction means 150 shown schematically as pivotally connected to radially outer ends 152 of the trailing edges 130. The ejector positioning means 128 closes the ejector doors 126 in this mode of operation. The flow area $A_8$ of the first throat 80 has a value less than the maximum value associated with the position of the throat 80 in the first position illustrated in FIG. 3 for take-off operation of the engine 12.

Figure 5:
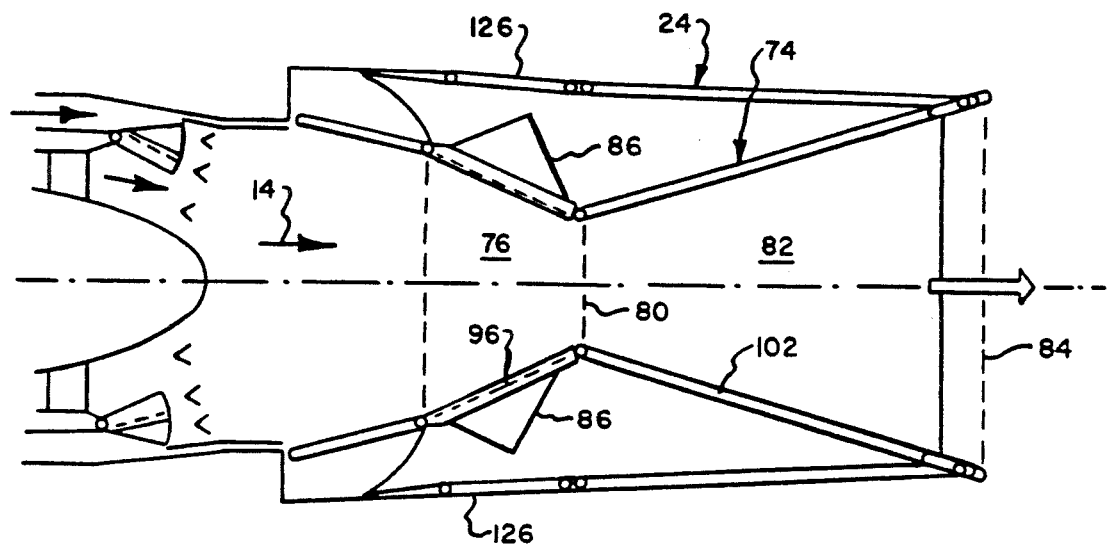
FIG. 5 is a schematic, longitudinal sectional view of the first exhaust assembly embodiment illustrated in FIG. 3 shown in a third position with the chutes retracted and the CD nozzle disposed for operation at supersonic velocity of the aircraft.

Illustrated in FIG. 5 is the exhaust assembly 24 wherein the CD nozzle 74 is in a third position with the chutes 86 disposed in the retracted position, the doors 126 closed, and the throat area $A_8$ of the first throat 80 having a value less than the maximum value associated with the first position illustrated in FIG. 3, and the flow area $A_9$ of the outlet 84 having a maximum value. The CD nozzle 74 is conventionally positioned for forming the converging nozzle 76 for accelerating the exhaust gases 14 to Mach 1 at the first throat 80 and further accelerating the exhaust gases 114 in the diverging channel 82 to supersonic velocities for maximum thrust from the engine 12 as is conventionally known.

Figure 6:
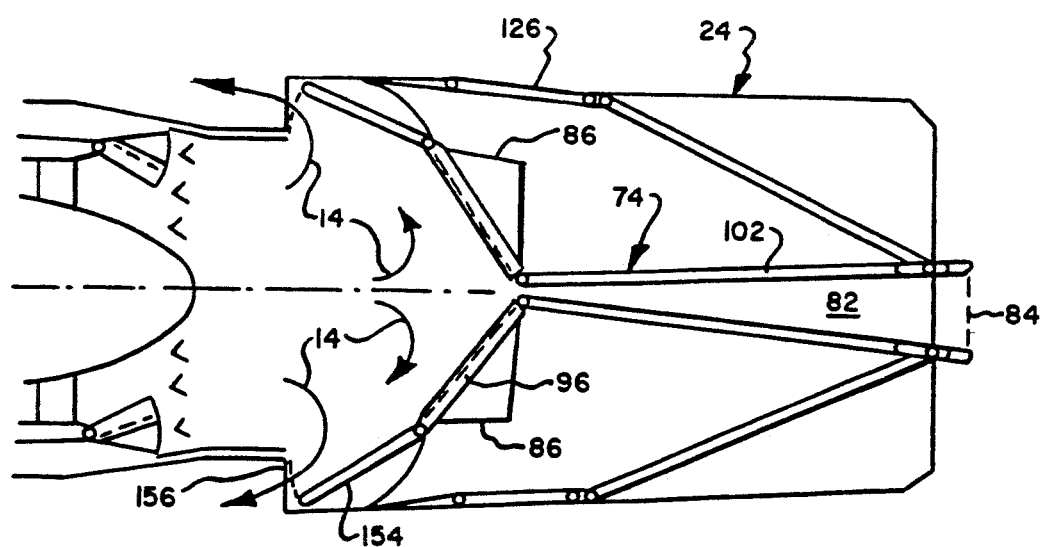
FIG. 6 is a schematic, longitudinal sectional view of the first exhaust assembly embodiment illustrated in FIG. 3 shown in a fourth position with the chutes retracted and the CD nozzle disposed for obtaining thrust reversal during landing of the aircraft.

Illustrated in FIG. 6 is the exhaust assembly 74 wherein the CD nozzle 74 is conventionally positioned so that the primary flaps 96 contact each other for blocking discharge of the exhaust gases 14 from the outlets 84 for providing thrust reverse operation. In this mode of operation, a plurality of conventional thrust reverser doors 154 which are pivotally connected adjacent to the primary flaps 96 are opened for providing forwardly facing thrust reverser. outlets 156. In this mode of operation, the chutes 86 are also disposed in the retracted position and the ejector doors 126 are closed.

Illustrated in FIGS. 9A, 9B, 9C and 10 is another embodiment of the present invention wherein the trailing edge first and second legs of the chutes 86 are serpentine for increasing the shear perimeter. In this embodiment, the trailing edge first and second legs 132 and 134 are castellated both for providing increased shear perimeter and for providing a chute diverging nozzle 158 between adjacent ones of the chutes 86.

Figure 9A:
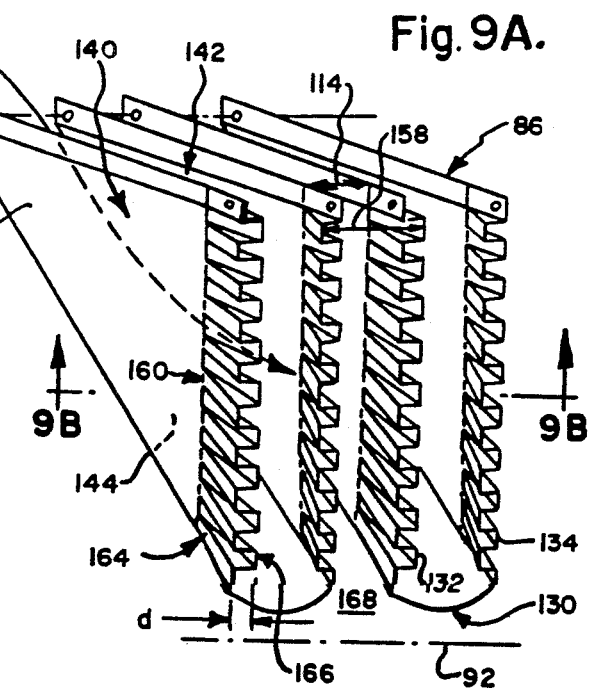
FIG. 9A is a perspective view of two adjacent chutes in accordance with another embodiment of the invention disposed in the deployed position.

More specifically, each of the chute side plates 140 and 142 includes an intermediate linear section 160 spaced upstream from and generally parallel to the trailing edge legs 132 and 134 and generally perpendicularly to the longitudinal centerline axis 90. These chutes 86 includes generally flat upstream portions 162 of the side plates 140 and 142 which extend from the upstream pivot 146 to intermediate section 160, as shown in FIGS. 9A and 9B, and which are inclined away from each other so that adjacent downstream portions 164 of respective chutes 86 converge for channeling the exhaust gases 14 to the throat 114.

Downstream portions 164 of the side plates 140 and 142 extend from the intermediate section 160 to the trailing edge legs 132 and 134. The side plate downstream portions 164 include a plurality of radially spaced troughs 166 which define the serpentine or castellated trailing edge legs 132 and 134 which troughs 166 are preferably U-shaped with square, or rounded, corners. Each of the troughs 166 is tapered from the intermediate section 160 to the trailing edge 130 and has a depth d which ranges from a zero value at the intermediate section 160 to a maximum value at the trailing edge legs 132 and 134.

Figures 9C, 9D:
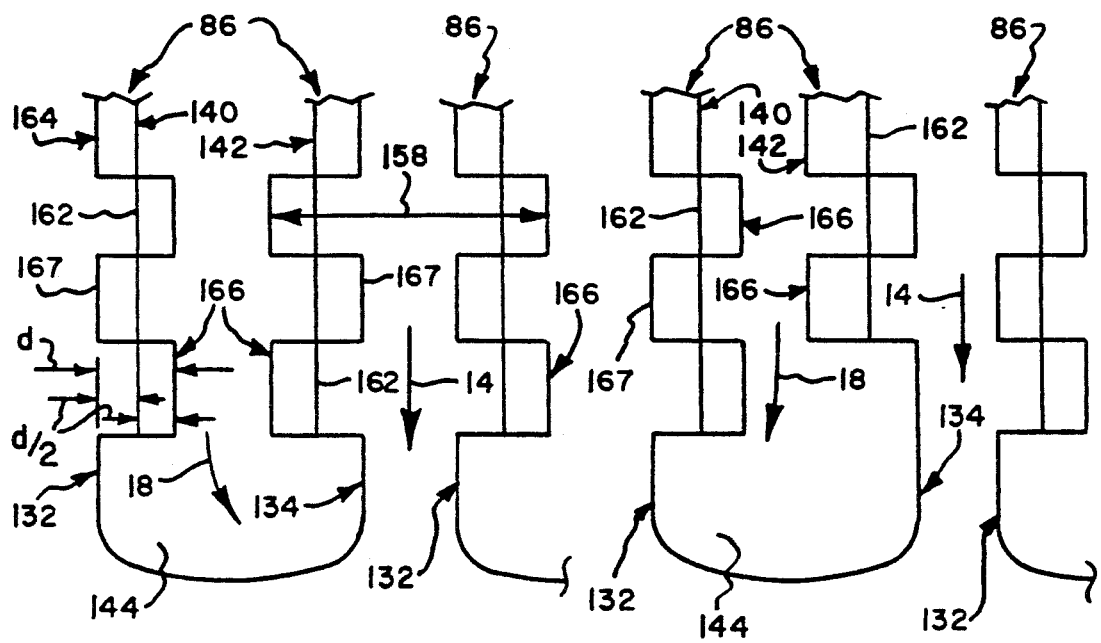
FIG. 9C is a schematic, sectional view of a portion of one chute and a portion of an adjacent chute shown in FIG. 9B taken along line 9C—9C.
FIG. 9D is an alternate embodiment of radial position of adjacent chute troughs similar to FIG. 9C, but having radially offset troughs.
Figure 9B:
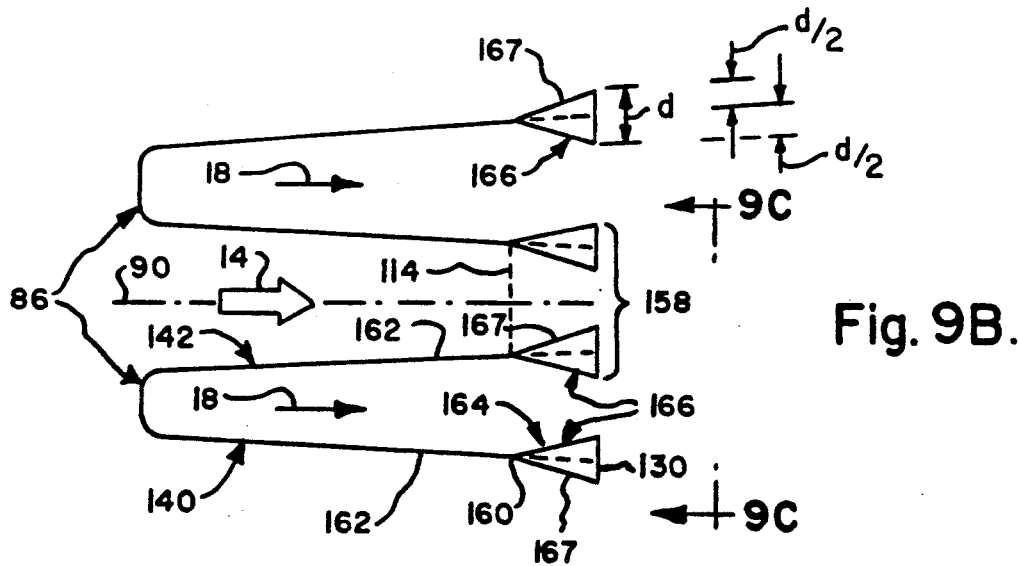
FIG. 9B is a schematic, sectional view of two adjacent chutes illustrated in FIG. 9A taken along line 9B—9B.

As shown more clearly in FIGS. 9B and 9C, the portion of the side plate downstream portion 164 disposed radially between adjacent troughs 166 may be referred to as a peak 167, and the trough depth d, therefore, extends perpendicularly inwardly from the peaks 167 toward an opposite side plate and respective trough 166. In this embodiment, opposite peaks 167 on adjacent side plates 140 and 142 of a chute 86 diverge away from each other and are inclined outwardly relative to the respective upstream portion 162 of side plates 140 and 142, and opposite troughs 166 converge toward each other and are inclined inwardly relative to the respective side plates 140 and 142. The total depth d in a preferred embodiment is equally split relative to the upstream portion 162 so that the trough 166 is symmetrical relative thereto and the peak 167 tapers from zero at the intermediate section 160 to d/2 at the trailing edge 130, and the bottom of the trough 166 is disposed at a maximum value of d/2 relative to the upstream portion 162 at the trailing edge 130.

The troughs 166 of adjacent ones of the side plates 140 and 142 of each chute 86 are radially aligned with and face. each other in the embodiment illustrated in FIG. 9C. Adjacent troughs 166 of an individual chute 86 converge relative to each other, whereas adjacent troughs 166 between adjacent ones of the chutes 86 diverge relative to each other. By this arrangement of the troughs 166, the chute diverging nozzle 158 is defined between adjacent ones of the chutes 86 which extends from the intermediate section 160 to the chute trailing edge 130. The chute intermediate section 160 defines the chute second throat 114 having a flow area $A_8''$ in this embodiment of the chutes 86. The trailing edge 130 in this embodiment, therefore, is not a throat of minimum flow area, but is a chute outlet 168 of maximum chute flow area.

In alternate embodiments, the side plate upstream portions 162 may be parallel to each other; the troughs 166 may be unsymmetrical relative to the side plate upstream portions 162, for example with the peaks 167 being coplanar therewith; and/or the troughs 166 may be radially offset relative to each other. The latter exemplary alternate embodiment is shown in FIG. 9D wherein a trough 166 is aligned radially with an opposite, adjacent peak 167 instead of another trough 166 as shown in FIG. 9C.

Figure 10:
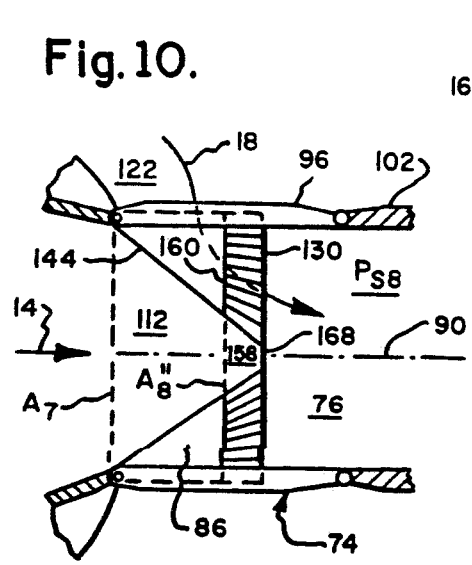
FIG. 10 is a side view of the chutes illustrated in FIG. 9A shown in the deployed position in the exhaust assembly illustrated in FIG. 3.

The chutes 86 are sized and spaced from each other so that when the chutes 86 are disposed in the deployed position as illustrated in FIG. 10 the chutes 86 define the chute converging nozzle 112 between the side plate upstream portions 162 and bottom plates 144 for accelerating the exhaust gases 14 to Mach 1 at the second throat 114 defined at the intermediate 160. The troughs 166 forming the chute diverging nozzle 158 are sized and spaced from each other for further accelerating the exhaust gases 14 to a velocity greater than Mach 1 in the chute diverging nozzle 158. This embodiment of the chutes 86 further decreases the static pressure $P_{s8}$ at the trailing edges 130 of the chutes 86 for further increasing the pressure differential between the ambient ejector airflow 18 and the CD nozzle 74 for improving the ejection, or drawing in, of the ejector airflow 18 trough the chutes 86. Furthermore, since the chute diverging nozzle 158 accelerates the exhaust gases 14 to supersonic velocities, the performance of exhaust assembly 24 is improved resulting in an improved gross thrust coefficient $C_{fg}$ of the exhaust assembly 24.

Although the primary flaps 96 are shown in FIG. 10 as generally parallel to the centerline axis 90 and forming a generally constant area channel 76, they may also be inclined radially outwardly in a downstream direction so that the channel 76 diverges to cooperate in defining the chute diverging channel 158.

Figure 11:
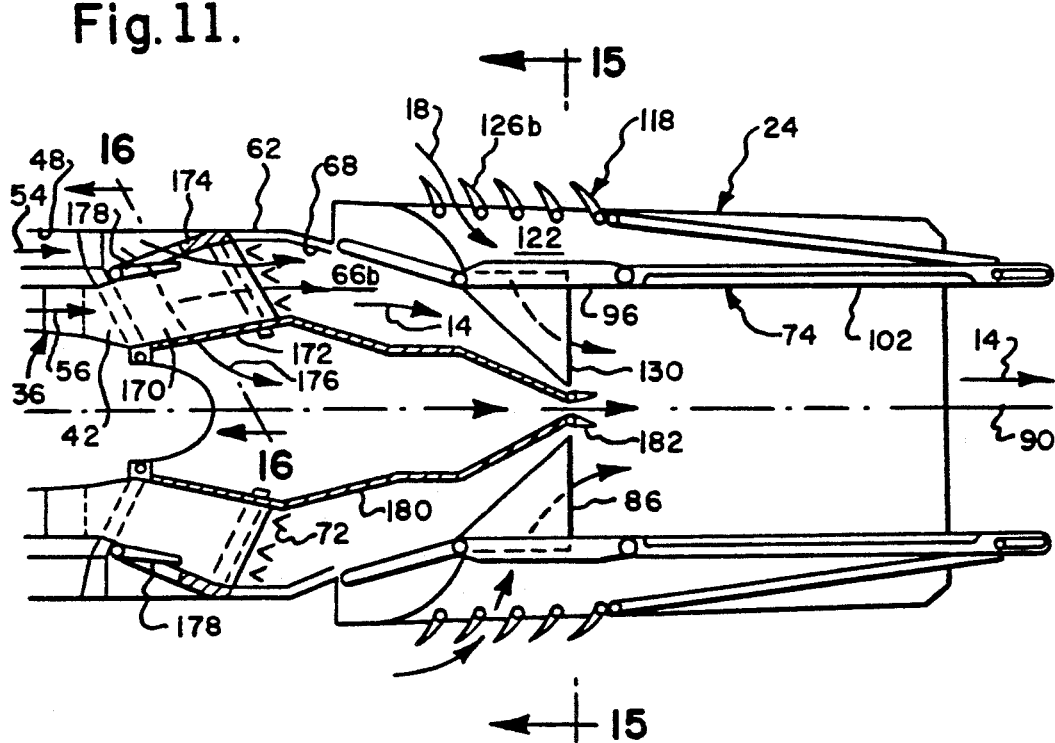
FIG. 11 is a schematic, longitudinal sectional view of an alternative embodiment of the exhaust assembly illustrated in FIG. 2 including a centerbody and chutes disposed in the deployed position.
Figure 15:
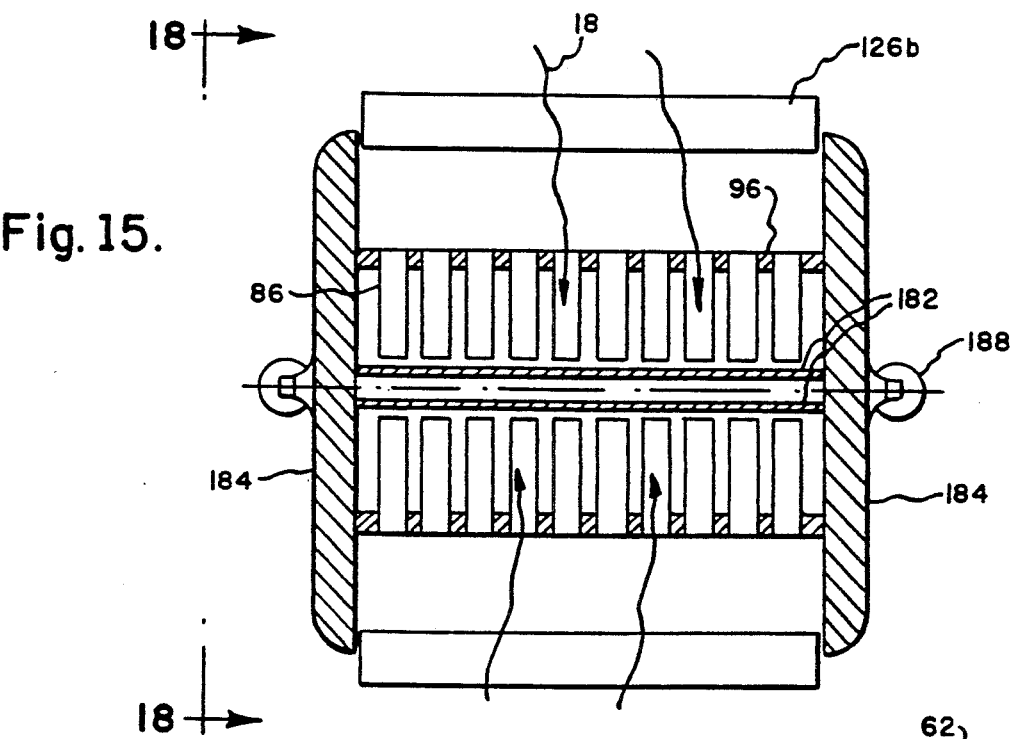
FIG. 15 is an upstream facing sectional view of the chutes illustrated in FIG. 11 taken along line 15—15.
Figure 16:
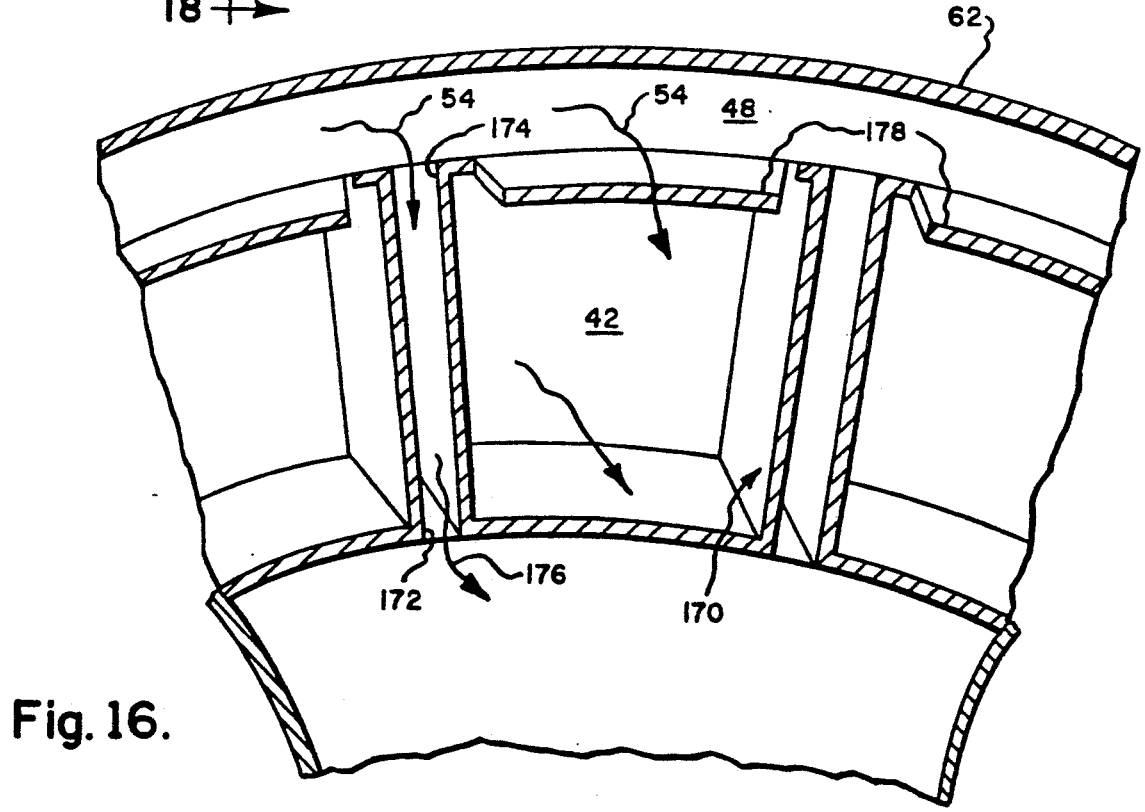
FIG. 16 is an upstream facing sectional view of several struts in the exhaust assembly illustrated in FIG. 11 taken along the line 16—16.

Illustrated in FIGS. 11 and 15 is a second embodiment of the exhaust assembly 24 in accordance with the present invention. In this embodiment, the assembly 24 further includes a plurality of circumferentially spaced, radially extending hollow struts 170 illustrated also in FIG. 16. The struts 170 are disposed in the LPT outlet 42 with each strut having an outlet 172 at a radially inner end thereof, and an inlet 174 at a radially outer end thereof disposable in fluid communication with the bypass duct 48 for channeling a portion of the bypass air 54 from the duct 48 into the strut 170 as inverted airflow 176. Conventional variable area bypass injectors (VABIs) 178 are conventionally selectively positionable for controlling the amount of the bypass airflow 54 channeled between adjacent ones of the struts 170 and radially inwardly of the augmentor liner 68.

The exhaust assembly 24 further includes an annular centerbody 180 disposed in flow communication with the strut outlets 172 for receiving the inverted airflow 176. The centerbody 180 extends downstream from the struts 170 and between the primary flaps 96. Means in the form of a pair of radially spaced apart outlet flaps 182 are provided at a downstream end of the centerbody 180 for selectively discharging the inverted airflow 176 from the centerbody 180 and adjacent to the chutes 86 when positioned in the deployed position. The outlet flaps 182 are positionable in an open position when the chutes are disposed in the deployed position as illustrated in FIG. 11, and are positionable in a closed position preventing discharge of the inverted airflow 176 therefrom when the chutes 86 are in the retracted position as illustrated, for example in FIG. 12. In the chute deployed position as illustrated in FIG. 11, the outlet flaps 182 are positioned adjacent to the chute trailing edges 130 so that exhaust gases 14 are mixed with ejector airflow 18 channeled through the chutes 86 and with the inverted airflow 176 discharged from the outlet flaps 182 for suppressing noise from the exhaust gases 14.

In this embodiment of the invention, the ejector doors 126 comprise a plurality of axially spaced apart hinged louvers 126b effective in the door open position for receiving the ejector airflow 18 between adjacent ones of the louvers 126b for being channeled through the ejector channel 122 to the chutes 86.

The exhaust assembly 24 in this second embodiment of the invention includes an augmentor 66b positioned axially between the struts 170 and the chutes 86, and radially between the casing 62 and the centerbody 180. Except for these additional structures described above for the second embodiment of the invention illustrated in FIG. 11, the exhaust assembly 24 of FIG. 11 is generally similar in structure and function to the first embodiment of the exhaust assembly 24 illustrated in FIG. 3.

Figure 12:
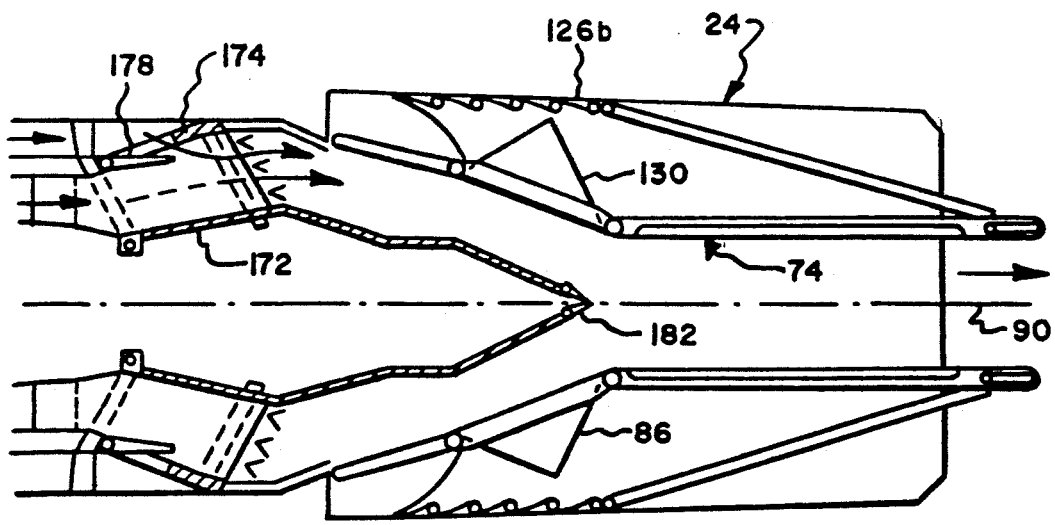
FIG. 12 is a schematic, sectional view of the second exhaust assembly embodiment of the invention illustrated in FIG. 11 wherein the chutes are disposed in a retracted position for operation through transonic velocities of the aircraft.
Figure 13:
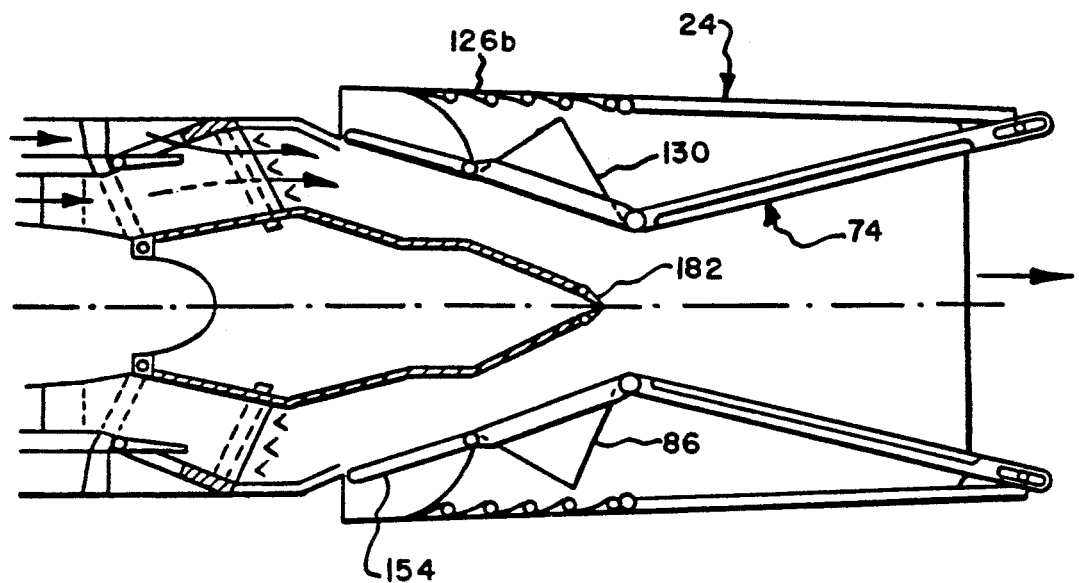
FIG. 13 is a schematic, sectional view of the second exhaust assembly embodiment illustrated in FIG. 11 wherein the chutes are retracted and the CD nozzle is disposed for operation of the aircraft at supersonic velocity.
Figure 14:
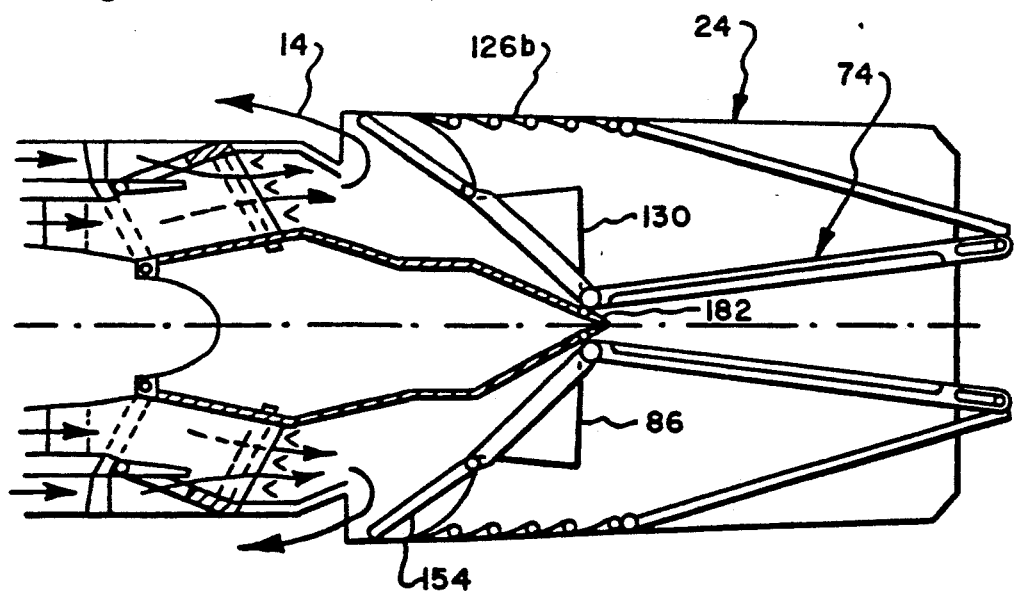
FIG. 14 is a schematic, sectional view of the second exhaust assembly embodiment illustrated in FIG. 11 with the chutes retracted and the CD nozzle positioned for obtaining thrust reversal during landing of the aircraft.

The second embodiment of the exhaust assembly 24 illustrated in the respective modes of operation in FIGS. 12, 13 and 14 are directly analogous to the operation in the modes illustrated in FIGS. 4, 5 and 6, respectively. In FIGS. 12, 13 and 14, the chutes 86 are disposed in the retracted position, the outlet flaps 182 are closed, the ejector doors 126b are closed, and the CD nozzle 74 is positioned and operated conventionally.

Figure 17:
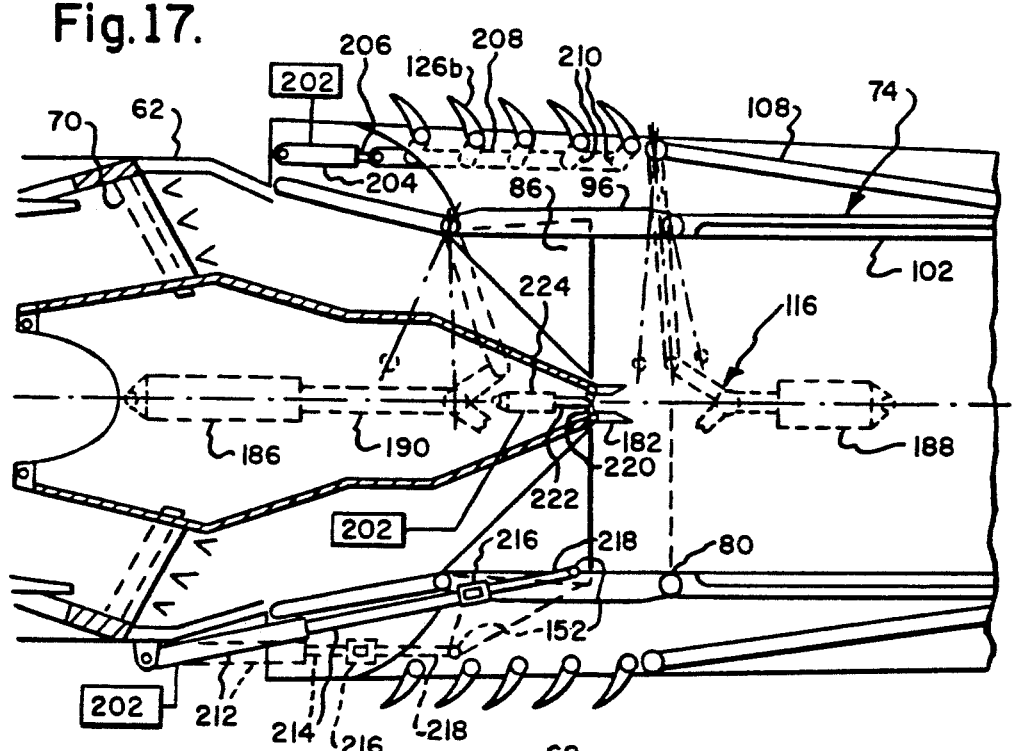
FIG. 17 is a schematic, sectional view of the second exhaust assembly embodiment illustrated in FIG. 11 including means for actuating the chutes and the CD nozzle.
Figure 18:
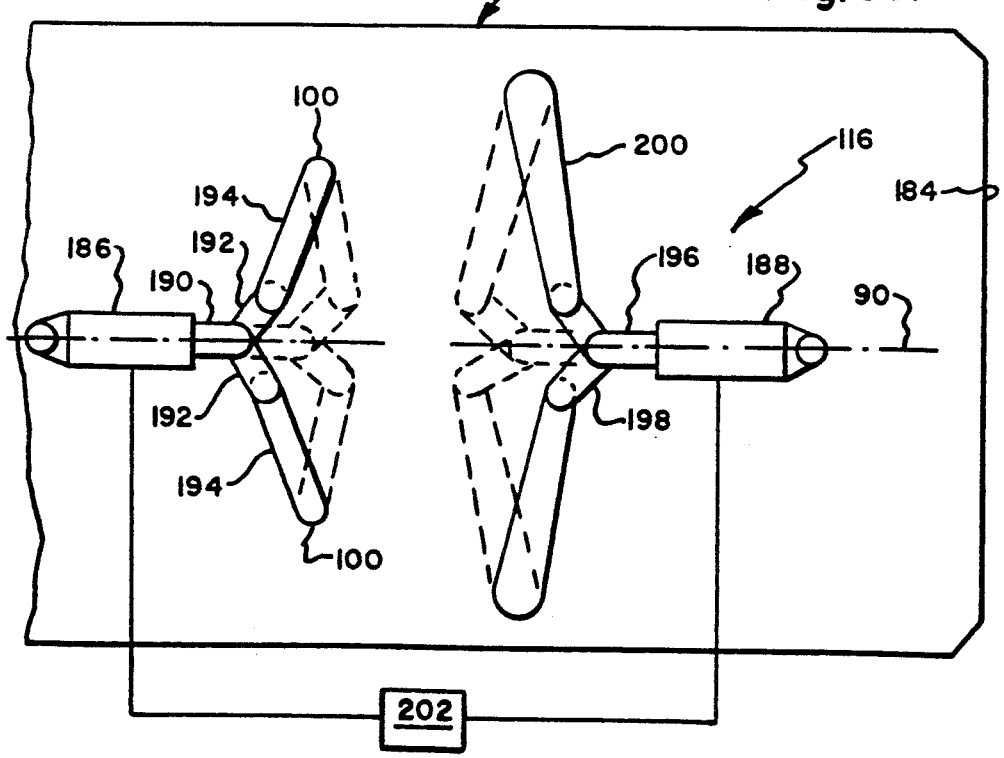
FIG. 18 is a side view of the exhaust assembly illustrated in FIG. 15 taken along line 18—18 showing a portion of the actuating means.

Illustrated in FIGS. 17 and 18, and FIG. 15, is one embodiment of the positioning means 116 shown in FIG. 3 for positioning the primary and secondary flaps of all of the embodiments of the invention described above wherein the CD nozzle 74 is in the form of a rectangular 2D CD nozzle. The casing 62 includes two transversely spaced apart sidewalls 184 to which are pivotally connected conventional first and second linear actuators 186 and 188. The first actuator 186 includes an extendable first rod 190 pivotally connected to a pair of first links 192. Each of the first links 192 is pivotally connected to a first lever 194 which is fixedly connected to a respective primary flap upstream end 100. Extension and retraction of the first rod 190 pivots the primary flap 96 about its upstream end 100 for increasing and decreasing the area $A_8$ of the throat 80.

The second actuator 188 includes an extendable second rod 196 pivotally connected to a pair of second links 198 which are in turn pivotally connected to a pair of second levers 200. The second levers 200 are fixedly connected to upstream ends of the outer flaps 108. Upon extension and retraction of the second rods 196, the outer flaps 108 are pivoted and in turn pivot the secondary flaps 102 relative to the primary flaps 96 for increasing and decreasing the flow area $A_9$ of the outlet 84. Conventional control means 202 are operatively connected to the first and second actuators 186 and 188 for predeterminedly controlling operation of the CD nozzle 74.

The doors 126b may be positioned by a door actuator 204 conventionally pivotally connected at one end to the casing 62 and including at an opposite end an extendable rod 206 pivotally connected to a unison rod 208 which is pivotally connected to respective levers 210 fixedly connected to the louvers 126b. The door actuator 204 is operatively connected to the control 202 which is effective for extending the door rod 206 for closing the louvers 126b and retracting the rod 206 for opening the louvers 126b.

In all of the above embodiments of the invention, the chute retraction means 150 is in the form of a conventional linear actuator 212 (only one of which is shown) pivotally connected at one end to the casing 62 and at the other end thereof including an extendable actuator rod 214. A transverse connecting beam 216 is fixedly connected to the actuator rod 214 and includes a plurality of chute links 218 each pivotally connected to a respective one of the chutes 86 at the radially outer ends 152 thereof. The control 202 is operatively connected to the chute actuator 212 for retracting the rod 214 for positioning the chutes 86 in the retracted position, and for extending the rod 214 for positioning the chutes 86 in the deployed position as required.

The outlet flaps 182 each include an upstream extending link 220 fixedly connected thereto which links 220 are pivotally connected to an extendable actuator rod 222 of a flap actuator 224. The actuator 224 is conventional and is pivotally connected to the casing 62 and operatively connected to the control 202 for extending the rod 222 for opening the flaps 182 and for retracting the rod 222 for closing the flaps 182 as required.

Figure 19:
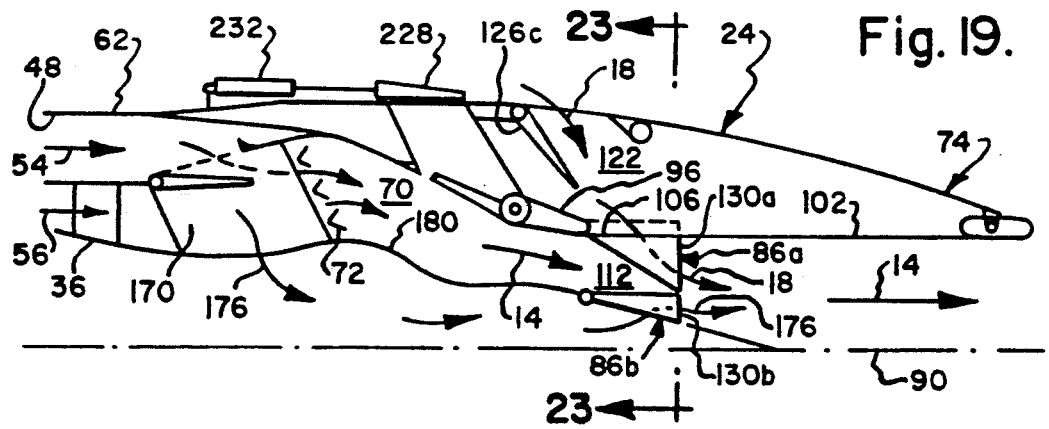
FIG. 19 is a schematic, sectional view of a third embodiment of the exhaust assembly illustrated in FIG. 1 showing chutes in the deployed position.
Figure 20:
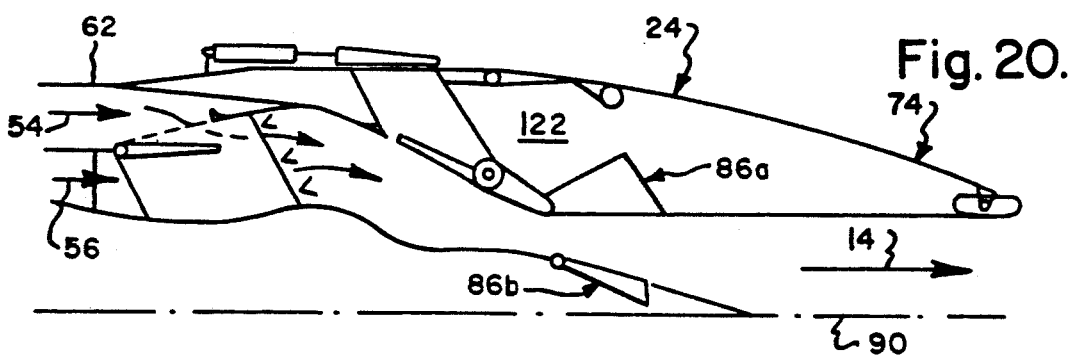
FIG. 20 is a schematic, sectional view of the third embodiment of the exhaust assembly illustrated in FIG. 19 showing the chutes in the retracted position and the CD nozzle positioned for transonic operation and the aircraft.

Illustrated in FIGS. 19-22 is a third embodiment of the exhaust assembly 24 in accordance with the present invention. In this third embodiment, the chutes 86 are in the form of first chutes 86a which are disposed not in the primary flaps 96 as in the first and second embodiments, but in the secondary flaps 102 and are pivotal from the upstream end 106 thereof. Just as in the second embodiment of the invention as illustrated in FIG. 11, for example, the third embodiment also includes the status 170 and the centerbody 180 for channeling the inverted airflow 176. Instead of the outlet flaps 182, second ones of the chutes 86, i.e., second chutes 86b are disposed at the downstream end of the centerbody 180. Both the first chutes 86a and the second chutes 86b are substantially identical except for size and are both positionable in a deployed position extending into exhaust gases 14 and in the retracted position generally coextensive with the secondary flaps 102 and the centerbody 180, respectively. FIG. 19 illustrates the first and second chutes 86a and 86b disposed in the deploying position with respective trailing edges thereof 130a and 130b, respectively, radially aligned with each other. In this third embodiment of the invention, the ejector doors 126 are in the form of flapper doors 126c which are pivoted at upstream ends thereof and positionable in an open position inclined radially inwardly for channeling the ambient airflow 18 through the ejector channel 122 and through the first chutes 86a, and in a closed position, as illustrated in FIG. 20, for example, wherein the doors 126c block the ambient airflow 18 from entering the ejector channel 122.

Figure 21:
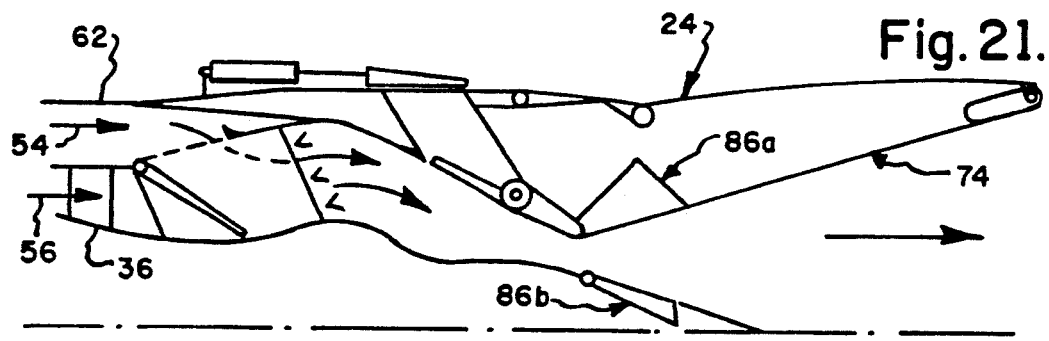
FIG. 21 is a schematic, sectional view of the third embodiment of the exhaust assembly illustrated in FIG. 19 shown with the chutes in the retracted position and the CD nozzle positioned for supersonic operation of the aircraft.
Figure 22:
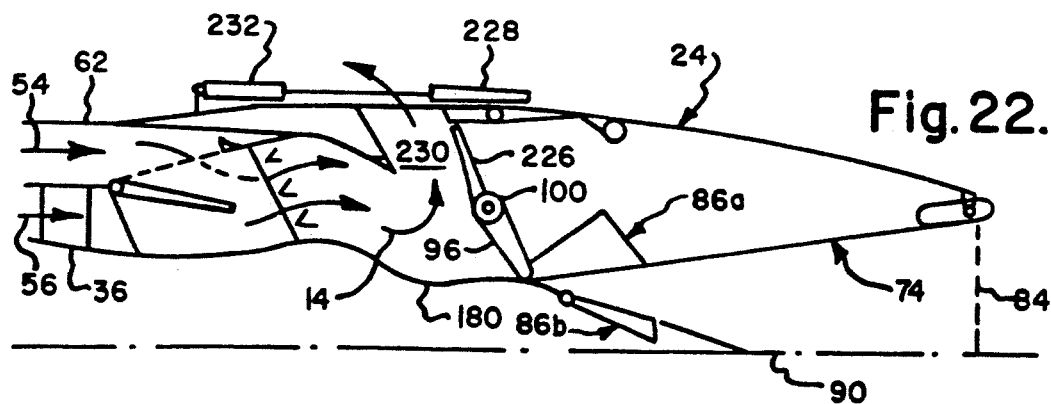
FIG. 22 is a schematic, sectional view of the third embodiment of the exhaust assembly illustrated in FIG. 19 with the chutes disposed in the retracted position and the CD nozzle positioned for obtaining thrust reversal during landing of the aircraft.

The third embodiment of exhaust assembly 24 as illustrated in FIGS. 20-22 corresponds with the modes of operation of the second embodiment, for example as illustrated in FIGS. 12-14, respectively. In these three modes of operation for transonic, supersonic, and thrust reverser operation, the first and second chutes 86a and 86b are disposed in the retracted position and the ejector doors 126c are closed. In the trust reverse mode of operation of exhaust assembly 24 as illustrated in FIG. 22, the primary flaps 96 are positioned to contact the centerbody 180 for blocking exhaust gases 14 from flowing through the outlet 84. A pivoted thrust reverser door 226 extending from the primary flap upstream end 100 is positioned in an open position along with a sliding door 228 for opening a thrust reversing flow channel 230 for channeling the exhaust gases 14 in a generally upstream direction for obtaining thrust reversal. The first door 226 is conventionally positioned, and the second door 228 is also conventionally positioned by an actuator 232 for example. When the exhaust assembly 24 is not in the thrust reversal mode illustrated in FIG. 22, the first and second doors 226 and 228 are closed for blocking passage of the exhaust gases 14 through the reverser flow channel 230.

Figure 23:
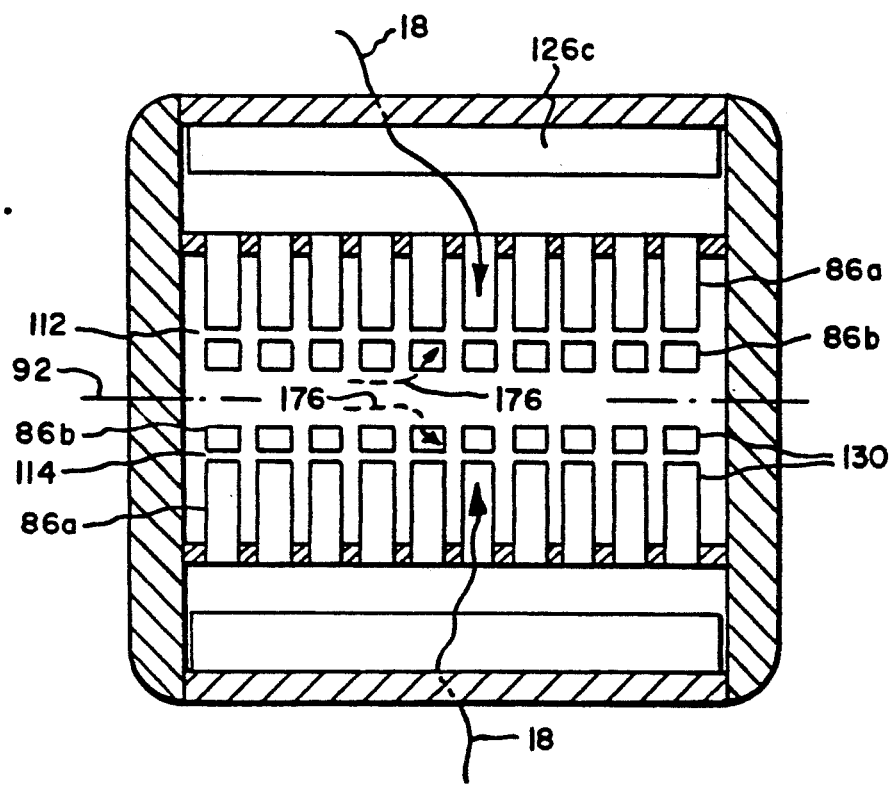
FIG. 23 is an upstream facing, sectional view of the chutes of the third embodiment of the exhaust assembly illustrated in FIG. 19 taken along line 23—23.

Referring to FIGS. 19 and 23, the first and second chutes 86a and 86b are shown in more particularity. The first chutes 86a face the second chutes 86b and collectively define therebetween the chute converging nozzle 112 when the chutes 86a and 86b are disposed in the deployed position. The first and second chutes 86a and 86b are preferably radially aligned with each other wherein the CD nozzle 74 is a rectangular 2D nozzle. The first chutes 86a are transversely aligned with each other generally parallel to the transverse axis 92, and similarly the second chutes 86b are transversely aligned with each other and generally parallel to the transverse axis 92. In this third embodiment of the invention, the trailing edges 130 of the first and second chutes 86a and 86b are radially aligned at a common axial position along the longitudinal centerline axis 90 to define the chute second throat 114 at the trailing edges 130a and 130b. However, in an alternate embodiment of the invention, the chutes 86a and 86b could also take the form of the chutes 86 illustrated in FIGS. 9 and 10. The first chutes 86a receive the ambient ejector airflow 18 and the second chutes 86b receive the inverted airflow 176 from the centerbody 180 for mixing with the exhaust gases 14. This third embodiment of the present invention provides a relatively large amount of the shear perimeter defined at the trailing edges 130 of both the first chutes 86a and the second chutes 86b.

Figure 24:
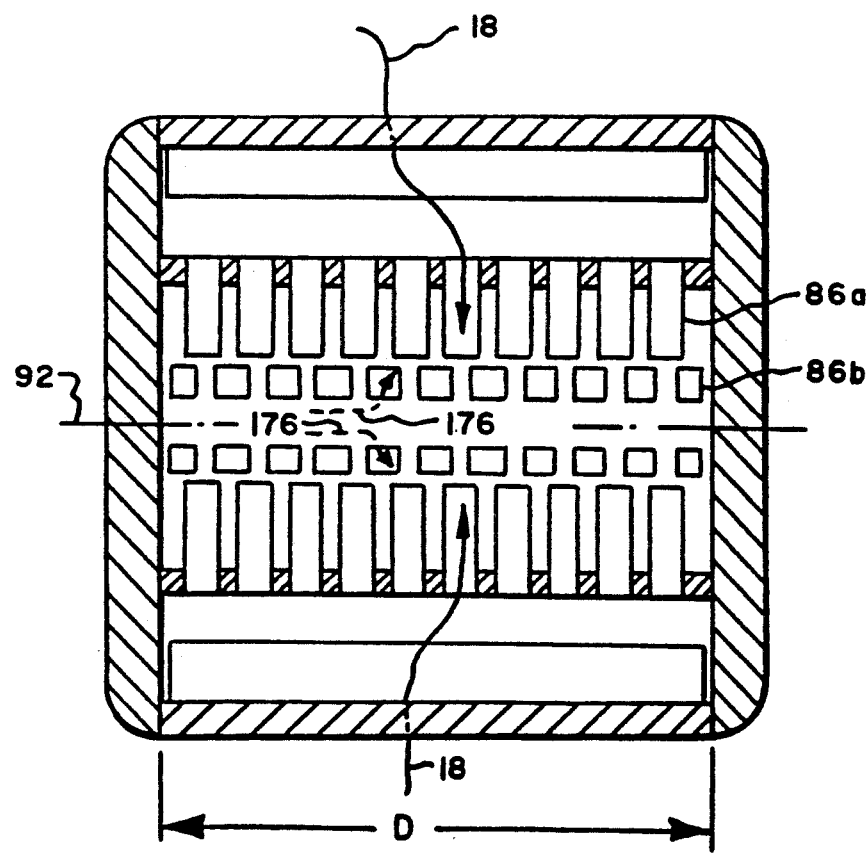
FIG. 24 is an upstream facing, sectional view of an alternate embodiment of the chutes illustrated in FIG. 23.

Illustrated in FIG. 24 is another embodiment of the first and second chutes 86a and 86b illustrated in FIG. 23. In this embodiment, the second chutes 86b are offset along the transverse axis 92 relative to the first chutes 86a, and equidistantly spaced between adjacent ones of the first chutes 86a. The transverse width D of this embodiment for the HSCT engine cycle is generally equal to about the fan OD illustrated in FIG. 2, for example about 70 inches. And, the collective flow areas of the first chutes 86a channeling ejector air 18 is about 1500 square inches, of the second chutes 86b channeling the inverted air 176 is about 200 square inches; and of the second throat 114 ($A_8''$) channeling the exhaust gases 14 is about 1100 square inches.

In the major three embodiments of the exhaust assembly illustrated above, the CD nozzle 74 thereof could either be a generally rectangular 2D nozzle or an axisymmetric annular nozzle as represented by the schematic illustrations thereof. The three embodiments above have been described in particularity with respect to the preferred 2D nozzle arrangement. However, in an axisymmetric embodiment of the CD nozzle 74, the chutes 86 can be circumferentially and equiangularly spaced from each other as illustrated in FIG. 25. FIG. 25 represents an upstream facing view of the chutes 86 along line 7—7 of FIG. 3 for an axisymmetric embodiment. The chutes 86 would extend radially inwardly from the primary flaps 96.

Illustrated in FIG. 26 is another embodiment of the invention having an axisymmetric CD nozzle 74 and is a view looking upstream along line 23—23 of FIG. 19. Both the first chutes 86a and the second chutes 86b are circumferentially and equiangularly spaced from each other, respectively. In a preferred embodiment, the second chutes 86b are radially aligned with perspective ones of the first chutes 86a.

Illustrated in FIG. 27 is another embodiment of a relatively simply, generally U-shaped chute 86c that could be used in the various embodiments of the exhaust assembly 24 described above. In this embodiment, the side plates 140a and 142a are relatively small while still providing a substantial trailing edge 130.

Illustrated in FIG. 28 is another embodiment of a chute 86d which is generally V-shaped while still providing a relatively large shear perimeter in the trailing edge 130.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

For example, features from the various embodiments described above are interchangeable between those embodiments. Other types of conventional CD nozzles could be used in conjunction with the chutes 86, such as conventional CD plug nozzles. Any type of core engine could also be used for powering the aircraft at supersonic velocity, including turbofan/ramjet engines. In all of the embodiments, the chutes 86 are effective for providing the throat area ($A_8''$) required for efficient operation of the core engine 20 when deployed, while also surrounding the high velocity exhaust gases 14 with low velocity air (e.g., ejector airflow 18, inverted airflow 176) for suppressing noise. Furthermore, conventional acoustic panels can also be embodied in the various flowpath surfaces for further reducing noise.

Accordingly, what is desired to be secured by Letters Patent of the United States is the invention as defined and differentiated in the following claims:

We claim:

1. An exhaust assembly for an aircraft gas turbine engine including a core engine having an outlet for discharging exhaust gases comprising:

a casing having an inlet for receiving said exhaust gases from said core engine outlet;

a variable area converging-diverging CD nozzle attached to said casing and including a first throat having a flow area $A_8$ and an outlet having a flow area $A_9$ for channeling said exhaust gases said CD nozzle further including:

a plurality of spaced apart primary flaps defining therebetween a converging channel, each of said primary flaps having a downstream end, and an upstream and pivotally connected to said casing;

a plurality of spaced apart secondary flaps defining therebetween a diverging channel, each of said secondary flaps having an upstream end pivotally connected to a respective one of said primary flap donwstream ends to define said first throat, and a downstream end pivotally and slidably connected to said casing, said diverging channel extending downstream from said first throat to said nozzle outlet;

a plurality of spaced apart retractable chutes disposed upstream of said nozzle outlet in a flowpath surface and positionable in a deployed position inclined in a downstream direction radially away from said flowpath surface for forming a converging nozzle in fluid communication with said casing inlet including a second throat having a flow area $A_8''$ less than said first throat area $A_8$, and positionable in a retracted position generally coextensive with said flowpath surface;

means for channeling air along aft facing surfaces of said chutes into said CD nozzle for mixing with said exhaust gases when said chutes are disposed in said deployed position; and wherein each of said chutes has a generally U-shaped trailing edge including first and second transversely spaced apart legs, a base extending between said legs at radially inner ends thereof, and a top opening extending between said legs at radially outer ends thereof, said trailing edge being positioned in said exhaust gases when said chute is in said deployed position to define a shear perimeter wherein air provided by said channeling means along said trailing edge contacts said exhaust gases for mixing therewith, and said trailing edge being removed from said exhaust gases when said chute is in said retracted position; and said primary and secondary flaps being positionable in:

a first position wherein said first throat area $A_8$ has a maximum value and said chutes are disposed in said deployed position;

a second position wherein said chutes are disposed in said retracted position and said first throat area $A_8$ has a value less than said maximum value of said first throat area $A_8$; and a third position wherein said chutes are disposed in said retracted position, said first throat area $A_8$ has a value less than said maximum value of said first throat area $A_8$, and said nozzle outlet area $A_9$ has a maximum value.

2. An exhaust assembly according to claim 1 wherein said first position corresponds with a takeoff mode of operation of said aircraft gas turbine engine, said second position corresponds with transonic operation of said aircraft gas turbine engine; and said third position corresponds with supersonic operation of said aircraft gas turbine engine.

3. An exhaust assembly according to claim 1 further including means for positioning said chutes, primary flaps, and said secondary flaps.

4. An exhaust assembly according to claim 1 further including an augmentor disposed upstream of said chutes.

5. An exhaust assembly according to claim 1 wherein said CD nozzle is a 2D nozzle having a generally rectangular flowpath.

6. An exhaust assembly according to claim 1 wherein said CD nozzle is an axisymmetric nozzle having an annular flowpath.

7. An exhaust assembly according to claim 1 sized for channeling said exhaust gases from said core engine having an operating cycle for propelling said aircraft at supersonic velocity.

8. An exhaust assembly according to claim 7 wherein said aircraft supersonic velocity is greater than about Mach 2.

9. An exhaust assembly according to claim 8 wherein said core engine has a fan outer diameter, and said CD nozzle outlet has a maximum transverse length generally equal to said fan outer diameter.

10. An exhaust according to claim 1 wherein said trailing edge first and second legs are straight.

11. An exhaust assembly according to claim 1 wherein said trailing edge first and second legs are serpentine for increasing said shear perimeter.

12. An exhaust assembly according to claim 1 wherein said trailing edge first and second legs are castellated for increasing said shear perimeter.

13. An exhaust assembly according to claim 1 wherein said chute further includes generally triangular, spaced apart first and second side plates having said trailing edge legs as bases thereof, an inclined bottom plate extending between hypotenuses thereof, said side plates having an upstream pivot disposed at an apex of said triangular plate about which said chute is pivotable.

14. An exhaust assembly according to claim 13 wherein said chutes are disposed in said deployed position so that said chute converging nozzle is defined by outer surfaces of said bottom and side plates of said plurality of chutes.

15. An exhaust assembly according to claim 14 wherein said second throat is defined by said chute trailing edges.

16. An exhaust assembly according to claim 14 wherein each of said chute side plates includes an intermediate section spaced upstream from and generally parallel to said trailing edge leg to define a generally flat upstream portion extending from said intermediate section to said upstream pivot, and a downstream portion extending from said intermediate section to said trailing edge leg, said side plate downstream portion including a plurality of radially spaced troughs each having a depth extending toward a respective trough of an opposite side plate of said chute, said troughs being tapered for having a zero value of said depth at said intermediate section increasing to a maximum value at said trailing edge legs for defining said second throat at said chute intermediate sections and a chute diverging nozzle extending from said intermediate sections to said chute trailing edges between adjacent ones of said chutes.

17. An exhaust assembly according to claim 16 wherein said troughs are castellated.

18. An exhaust assembly according to claim 16 wherein said troughs of adjacent ones of said side plates of each chute are radially aligned with and face each other.

19. An exhaust assembly according to claim 16 wherein said chutes are sized and spaced from each other so that when positioned in said deployed position said chutes define said chute converging nozzle effective for accelerating said exhaust gases to Mach 1 at said second throat and further accelerating said exhaust gases to a velocity greater than Mach 1 in said chute diverging nozzle.

20. An exhaust assembly according to claim 19 wherein said primary flaps include a radially inner surface defining said flowpath surface and said chutes are pivotally joined to said primary flaps adjacent to said primary flap upstream ends.

21. An exhaust assembly according to claim 14 wherein said primary flaps include a radially inner surface defining said flowpath surface and said chutes are pivotally joined to said primary flaps adjacent to said primary flap upstream ends.

22. An exhaust assembly according to claim 21 wherein:

said chute bottom plate includes an inner surface defining said aft facing surface for channeling said air;

said air channeling means includes an ejector air channel extending from an ejector inlet in said casing for receiving ambient ejector air to an ejector outlet in said primary flap in flow communication with said chute bottom plate inner surface, and an ejector door positionable in an open position to uncover said ejector inlet when said chute is in said deployed position for allowing said ejector air to be drawn through said ejector channel along said bottom plate inner surface and said chute trailing edge by said exhaust gases flowable between adjacent ones of said chutes, and positionable in a closed position to cover said ejector inlet to block entry of said ejector air into said ejector channel when said chute is in said retracted position.

23. An exhaust assembly according to claim 22 wherein said ejector door comprises a plurality of spaced apart hinged louvers effective in said door open position for receiving said ejector air between adjacent louvers.

24. An exhaust assembly according to claim 22 wherein said ejector door comprises an articulated scoop effective in said door open position for providing an upstream facing scoop for receiving said ejector air.

25. An exhaust assembly according to claim 14 wherein said secondary flaps include a radially inner surface defining said flowpath surface and said chutes are pivotally joined to said secondary flaps adjacent to said secondary flap upstream end.

26. An exhaust assembly according to claim 14 wherein said chutes are sized and spaced from each other so that when positioned in said deployed position said chutes define said chute converging nozzle effective for accelerating said exhaust gases to Mach 1 at said second throat.

27. An exhaust assembly according to claim 1 wherein said core engine includes a low pressure turbine LPT outlet for discharging combustion gases into said casing, and a bypass duct surrounding said LPT outlet for discharging compressed bypass air into said casing, and said exhaust assembly further includes:

a plurality of circumferentially spaced, radially extending hollow struts disposable in said LPT outlet, each of said struts having an outlet, and an inlet disposable in flow communication with said bypass duct for channeling a portion of said bypass air from said bypass duct into said strut as inverted airflow;

a centerbody disposed in flow communication with said strut outlets for receiving said inverted airflow, and extending downstream from said struts and between said primary flaps; and means for selectively discharging said inverted airflow from said centerbody and adjacent to said chutes.

28. An exhaust assembly according to claim 27 wherein said inverted airflow discharging means comprises a pair of outlet flaps disposed at a downstream end of said centerbody positionable in an open position when said chutes are in said deployed position for mixing said inverted airflow with said exhaust gases flowable past said outlet flaps, and positionable in a closed position preventing discharge of said inverted airflow therefrom when said chutes are in said retracted position.

29. An exhaust assembly according to claim 28 wherein said outlet flaps are positioned adjacent to said chute trailing edges.

30. An exhaust assembly according to claim 29 further including an augmentor positioned axially between said struts and said chutes, and radially between said casing and said centerbody.

31. An exhaust assembly according to claim 29 wherein:
   said secondary flaps include a radially inner surface defining said flowpath surface and said chutes include first chutes pivotally joined to said secondary flaps adjacent to said secondary flap upstream ends;
   said inverted airflow discharging means comprises a plurality of second ones of said chutes disposed in said centerbody and facing said first chutes;
   said first and second chutes being disposed in said deployed position for defining said chute converging nozzle therebetween, said first chutes channeling ambient ejector airflow from outside said casing for mixing with said exhaust gases, and said second chutes channeling said inverted airflow for mixing with said exhaust gases.

32. An exhaust assembly according to claim 31 wherein:
   said first chute bottom plate includes an inner surface defining said aft facing surface for channeling said air;
   said air channeling means includes an ejector air channel extending from an ejector inlet in said casing for receiving ambient ejector air to an ejector outlet in said primary flap in flow communication with said first chute bottom plate inner surface, and an ejector door positionable in an open position to uncover said ejector inlet when said first chute is in said deployed position for allowing said ejector air to be drawn through said ejector channel along said bottom plate inner surface and said first chute trailing edge by said exhaust gases flowable between adjacent ones of said first chutes, and positionable in a closed position to cover said ejector inlet to block entry of said ejector air into said ejector channel when said first chute is in said retracted position.

33. An exhaust assembly according to claim 32 wherein said CD nozzle is a rectangular 2D nozzle and said first chutes are transversely aligned, and said second chutes are transversely aligned.

34. An exhaust assembly according to claim 33 wherein said second chutes are transversely offset relative to said first chutes.

35. An exhaust assembly according to claim 33 wherein said first chutes are radially aligned with said second chutes.

36. An exhaust assembly according to claim 32 wherein said CD nozzle is an annular, axisymmetric nozzle and said first chutes are circumferentially and equiangularly spaced from each other, and said second chutes are circumferentially and equiangularly spaced from each other.

37. An exhaust assembly according to claim 36 wherein said second chutes are radially aligned with respective ones of said first chutes.

* * * * *